United States Patent
Bustamante et al.

(10) Patent No.: US 12,425,809 B2
(45) Date of Patent: Sep. 23, 2025

(54) SYSTEM AND METHOD TO DYNAMICALLY MONITOR JOBSITE ASSIGNMENTS FOR AN ASSET

(71) Applicant: THERMA-STOR LLC, Madison, WI (US)

(72) Inventors: Diane Kathleen Bustamante, Elkhorn, WI (US); Keith James Hosli, River Ridge, LA (US); Erin Alan Hynum, Madison, WI (US); Glen Lawrence Rudie, Stoughton, WI (US); Jerome Paul Verhoeven, Sun Prairie, WI (US)

(73) Assignee: THERMA-STOR LLC, Madison, WI (US)

( * ) Notice: Subject to any disclaimer, the term of this patent is extended or adjusted under 35 U.S.C. 154(b) by 43 days.

(21) Appl. No.: 18/462,018

(22) Filed: Sep. 6, 2023

(65) Prior Publication Data
US 2024/0430644 A1 Dec. 26, 2024

Related U.S. Application Data

(63) Continuation-in-part of application No. 18/341,122, filed on Jun. 26, 2023.

(51) Int. Cl.
*H04W 4/029* (2018.01)
*G01S 19/01* (2010.01)
*H04W 4/021* (2018.01)

(52) U.S. Cl.
CPC .............. *H04W 4/029* (2018.02); *G01S 19/01* (2013.01); *H04W 4/021* (2013.01)

(58) Field of Classification Search
CPC ........ H04W 4/029; H04W 4/021; G01S 19/01
See application file for complete search history.

(56) References Cited

U.S. PATENT DOCUMENTS

| | | | |
|---|---|---|---|
| 8,130,096 B2 | 3/2012 | Monte et al. |
| 8,290,515 B2 | 10/2012 | Staton et al. |
| 8,604,925 B2 | 12/2013 | Monte et al. |
| 9,330,287 B2 | 5/2016 | Graczyk et al. |
| 9,652,955 B1 | 5/2017 | Ray et al. |
| 10,204,496 B2 | 2/2019 | Miller, II |
| 10,573,165 B2 | 2/2020 | Schwarzkopf et al. |
| 10,867,282 B2 | 12/2020 | Glunz |

(Continued)

OTHER PUBLICATIONS

DryMAX XL; htpps://drylink.usephoenix.com; printed Sep. 11, 2023.

*Primary Examiner* — Ryan W Sherwin
(74) *Attorney, Agent, or Firm* — Baker Botts L.L.P.

(57) ABSTRACT

An apparatus comprises a memory communicatively coupled to a processor. The memory may be configured to store geofences and existing asset location information. The processor may be configured to obtain first updated asset location information corresponding to a tagged asset, determine whether first global positioning coordinates in the first updated asset location information overlap a first geofence of a first jobsite location in response to determining that the tagged asset is coupled to at least one gateway, and generate a first jobsite assignment indicating that the tagged asset is located in a first jobsite location in response to determining that the first global positioning coordinates in the first updated asset location information overlap the first geofence.

17 Claims, 11 Drawing Sheets

(56) References Cited

U.S. PATENT DOCUMENTS

| | | |
|---|---|---|
| 11,030,709 B2 | 6/2021 | McLinden et al. |
| 11,573,558 B2 | 2/2023 | Cella et al. |
| 2015/0097674 A1* | 4/2015 | Mondal .................. H04W 4/029 340/572.1 |
| 2016/0026837 A1* | 1/2016 | Good ..................... G16H 40/20 340/539.13 |
| 2016/0142868 A1* | 5/2016 | Kulkarni .................. H04W 4/80 455/456.5 |
| 2016/0189514 A1* | 6/2016 | Todasco .................. G08B 25/08 340/8.1 |
| 2017/0318442 A1* | 11/2017 | Roy ....................... H04W 4/185 |
| 2018/0053154 A1* | 2/2018 | Schoening ............... H01Q 3/24 |
| 2019/0272497 A1* | 9/2019 | Tingler ................. G06Q 10/087 |
| 2019/0325174 A1* | 10/2019 | Ashaari .................. H04W 4/029 |
| 2020/0259896 A1 | 8/2020 | Sachs et al. |
| 2020/0288025 A1* | 9/2020 | Ebner ....................... G01S 5/01 |
| 2021/0058736 A1 | 2/2021 | Ghazzaoui et al. |
| 2021/0194528 A1 | 6/2021 | Zalewski et al. |
| 2021/0201613 A1 | 7/2021 | Meadow |
| 2022/0132396 A1 | 4/2022 | Crouthamel et al. |
| 2022/0148456 A1 | 5/2022 | Steketee et al. |
| 2022/0318529 A1* | 10/2022 | Vaught ................ G06K 7/10297 |
| 2024/0056772 A1* | 2/2024 | Loda ..................... H04W 4/024 |

\* cited by examiner

SYSTEM AND METHOD TO DYNAMICALLY MONITOR JOBSITE ASSIGNMENTS FOR AN ASSET

CROSS-REFERENCE TO RELATED APPLICATIONS

This application is a continuation-in-part of U.S. patent application Ser. No. 18/341,122, filed Jun. 26, 2023 and entitled "SYSTEM AND METHOD TO DYNAMICALLY MONITOR LOCATION INFORMATION OF ASSETS IN A PREDEFINED AREA."

TECHNICAL FIELD

The present disclosure relates generally to operation of a system configured to track one or more assets, and more specifically to a system and method to dynamically monitor jobsite assignments for an asset.

BACKGROUND

Multiple mechanical and electronic devices are used to perform operations (e.g., tasks) at jobsites around the world. Certain mechanical and electronic devices may be difficult to monitor at jobsites located in hazardous locations or in remote areas due to the size of the device (e.g., machinery tools). For example, a wrench may be left behind at an operator cabin of an oil rig/construction skid. Moreover, certain mechanical and electronic devices used or transported in mass may be lost at jobsites due to the number of devices in operation. For example, a specific drilling device may be lost in a warehouse containing multiple shipping containers with drilling equipment.

These mechanical and electronic devices may be difficult to assign to specific jobsites because the devices may be untraceable once personnel using a given device forget the location of the device in the process of performing operations at a given jobsite.

SUMMARY OF THE DISCLOSURE

In one or more embodiments, a system and a method disclosed herein dynamically monitor jobsite assignments for an asset. The system and the method may obtain one or more parameters to identify, track, and monitor an absolute location (e.g., geolocation on Earth) or a relative location (e.g., location with respect to one or more additional electronic devices) of each asset. In some assignments, the jobsite assignments may be multiple trusted locations that are associated with each asset over a predetermined period of time. An asset may be a mechanical device or an electronic device configured to perform one or more operations in the predefined area. The system and the method may detect the location of assets using one or more tags. The tags may be coupled to the interior or the exterior of a given asset. The tags may operate in multiple wireless communication protocols to transmit and receive signals informing of their absolute or relative location. In some embodiments, the tags may be reactive tags configured to provide absolute or relative location information in response to a reconnection request (e.g., a reconnection link from a gateway). In this regard, tagged assets may self-power in order to react to the reconnection link (e.g., the tags do not need to be powered by the asset or a power source). In other embodiments, the tags may be active tags configured to broadcast absolute or relative location information in a given area. In this regard, tagged assets may comprise a low-power source to power the tags.

In one or more embodiments, the system and the method may obtain tag identifiers and asset names associated with a specific asset in order to determine whether location information is known for the specific asset. At this stage, the system and the method may evaluate whether the specific asset is associated to a trusted device located at a trusted location (e.g., warehouse or a jobsite). In response, the location information for the specific asset may be updated to determine a new location for the specific asset, restate a previous location for the specific asset, or indicate an unknown location for the specific asset. In some embodiments, the system and the method may reestablish communication with the specific asset via a gateway or another trusted electronic device and determine updated location information of the specific asset based at least in part upon last known location information or last identified interactions of the specific asset. For example, the specific asset may be tracked or monitored based on previous interactions with the gateway or another trusted electronic device. In this regard, if the location of the specific asset is unknown, the system and the method may obtain updated location information for the specific asset by listening for possible broadcasted signals from assets in a predefined area, identifying a broadcasted signal from the specific asset, and generating one or more reconnection links to trigger a response from the specific asset.

In one or more embodiments, the system and the method may obtain last known location information associated with a given asset. At this stage, the system and method may evaluate whether the last known location information associated with the given asset corresponds to a jobsite location. Further, the system and method may determine whether an updated location information of the asset is within a threshold distance of the last known location information associated with the asset. The jobsite location may be a trusted location in which the given asset is expected to perform one or more operations. The given asset may be assigned to the jobsite location after the given asset is determined to be at the jobsite location over a predetermined time duration. In this regard, jobsite assignments for the given asset may be updated or may remain the same over time based at least in part upon one or more changes in location information. For example, the given asset may be associated with a first jobsite assignment after the location information of the given asset is determined to be at a first jobsite location and the given asset may be associated with a second jobsite assignment after the location information of the given asset is determined to be at a second jobsite location.

In one or more embodiments, the system and the method described herein are integrated into a practical application of dynamically monitoring jobsite assignments for an asset. In this regard, the system and the method are integrated into a practical application of reducing or preventing asset losses in jobsites by associating assets to a nearby jobsite location. In particular, the assets may be monitored directly or indirectly via one or more assisting assets. In some embodiments, the system and the method improve operations by preventing asset losses in jobsites located in hazardous locations or in remote areas where assets may be left behind. At these jobsites, the system and the method may monitor assets even when assets are small machinery tools. Moreover, certain mechanical and electronic assets used or transported in mass are prevented from being lost at jobsites due to the number of assets in operation. For example, a specific drilling device may be dynamically monitored in a warehouse containing multiple shipping containers with drilling equipment.

In one or more embodiments, the system and the method may be performed by an apparatus, such as the server, communicatively coupled to one or more gateways and one or more tagged assets. Further, the system may comprise the apparatus. In addition, the system and the method may be performed as part of a process performed by the apparatus communicatively coupled to the one or more gateways and the one or more tagged assets. As a non-limiting example, the apparatus may comprise a memory and a processor communicatively coupled to one another. The memory may be configured to store multiple geofences and existing asset location information comprising current global positioning coordinates of one or more tagged assets. Each geofence indicates a jobsite location. The processor is configured to obtain updated asset location information corresponding to a tagged asset. The updated asset location information comprises possible updates to the existing asset location information. Further, the processor is configured to determine whether first global positioning coordinates in the first updated asset location information overlap a first geofence of a first jobsite location in response to determining that the tagged asset is coupled to at least one gateway and generate a first jobsite assignment indicating that the tagged asset is located in a first jobsite location in response to determining that the first global positioning coordinates in the first updated asset location information overlap the first geofence.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
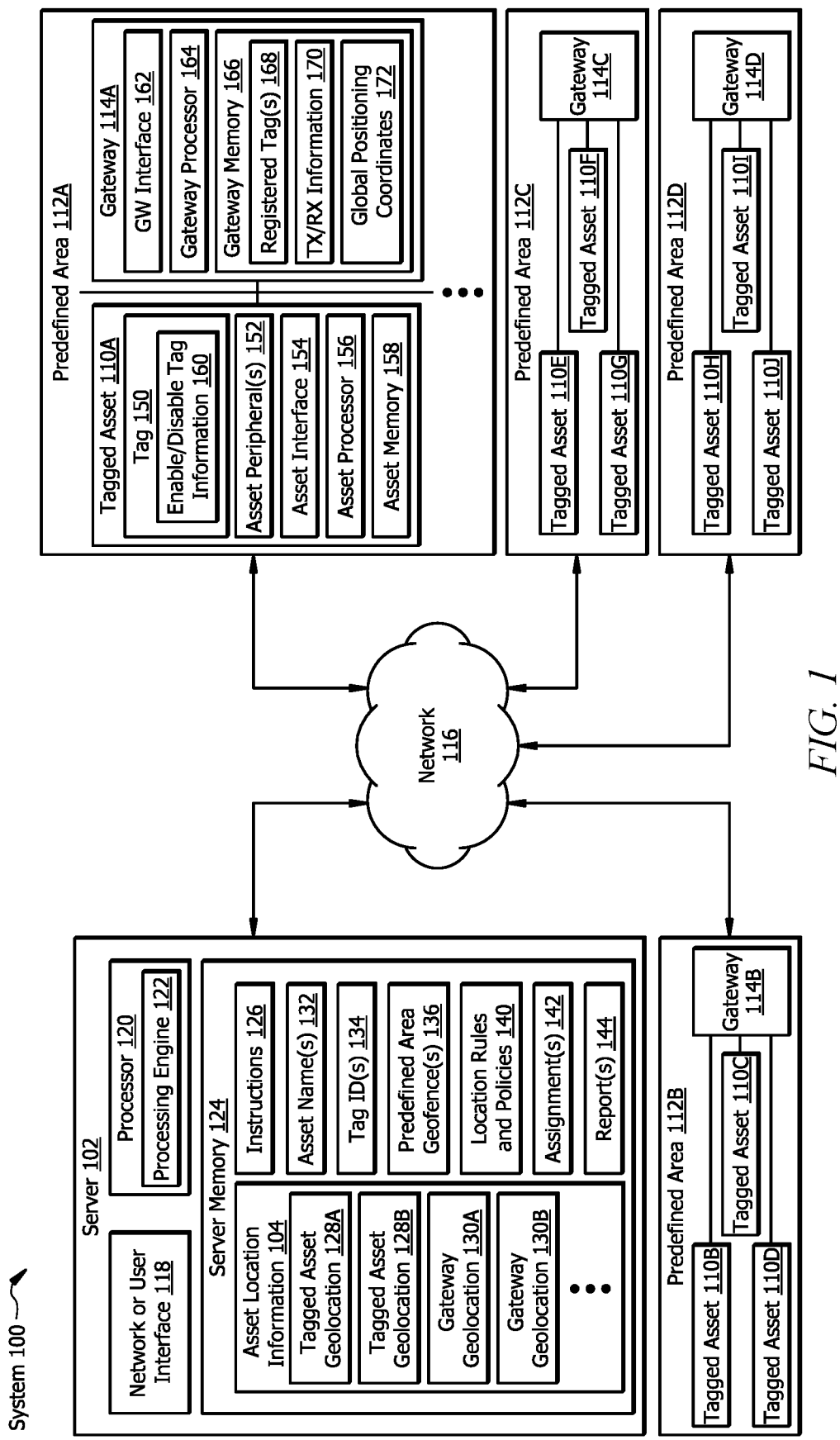
FIG. 1 illustrates an example system in accordance with one or more embodiments.
Figure 2:
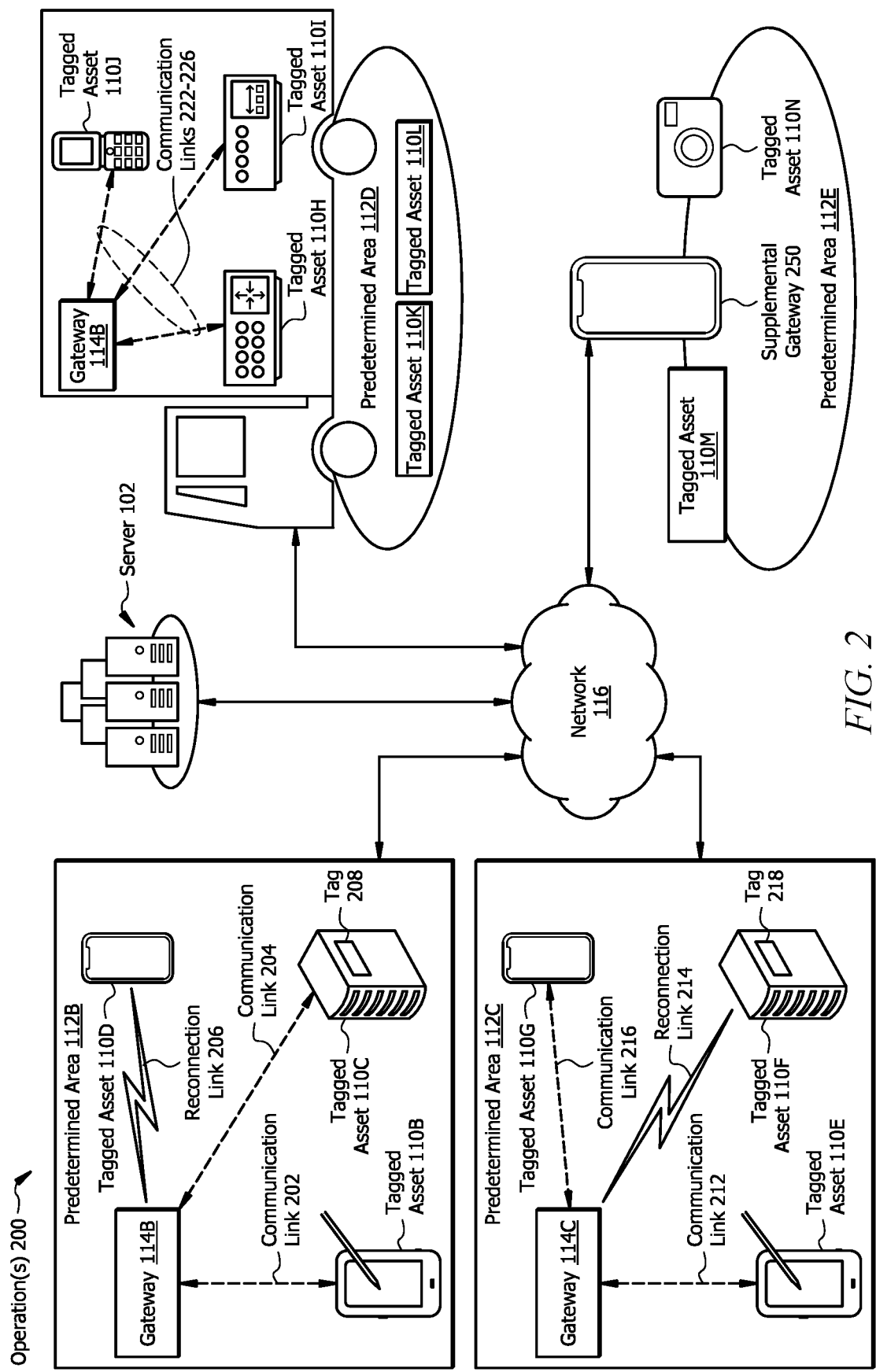
FIG. 2 illustrates example operations performed by the system of FIG. 1 in accordance with one or more embodiments.
Figure 3A:
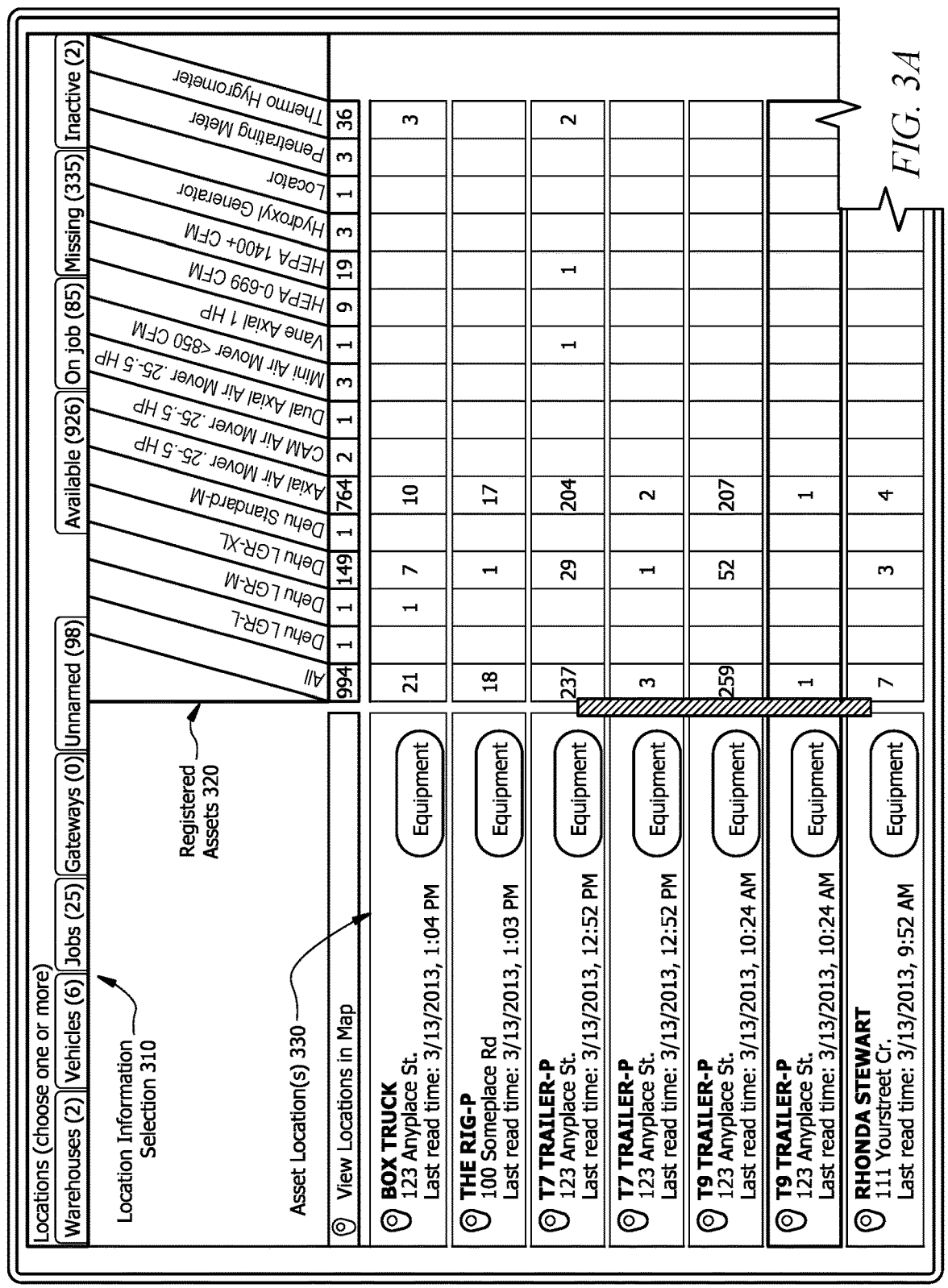
FIGS. 3A and 3B illustrate example asset tracking interfaces in accordance with one or more embodiments.
Figure 3B:
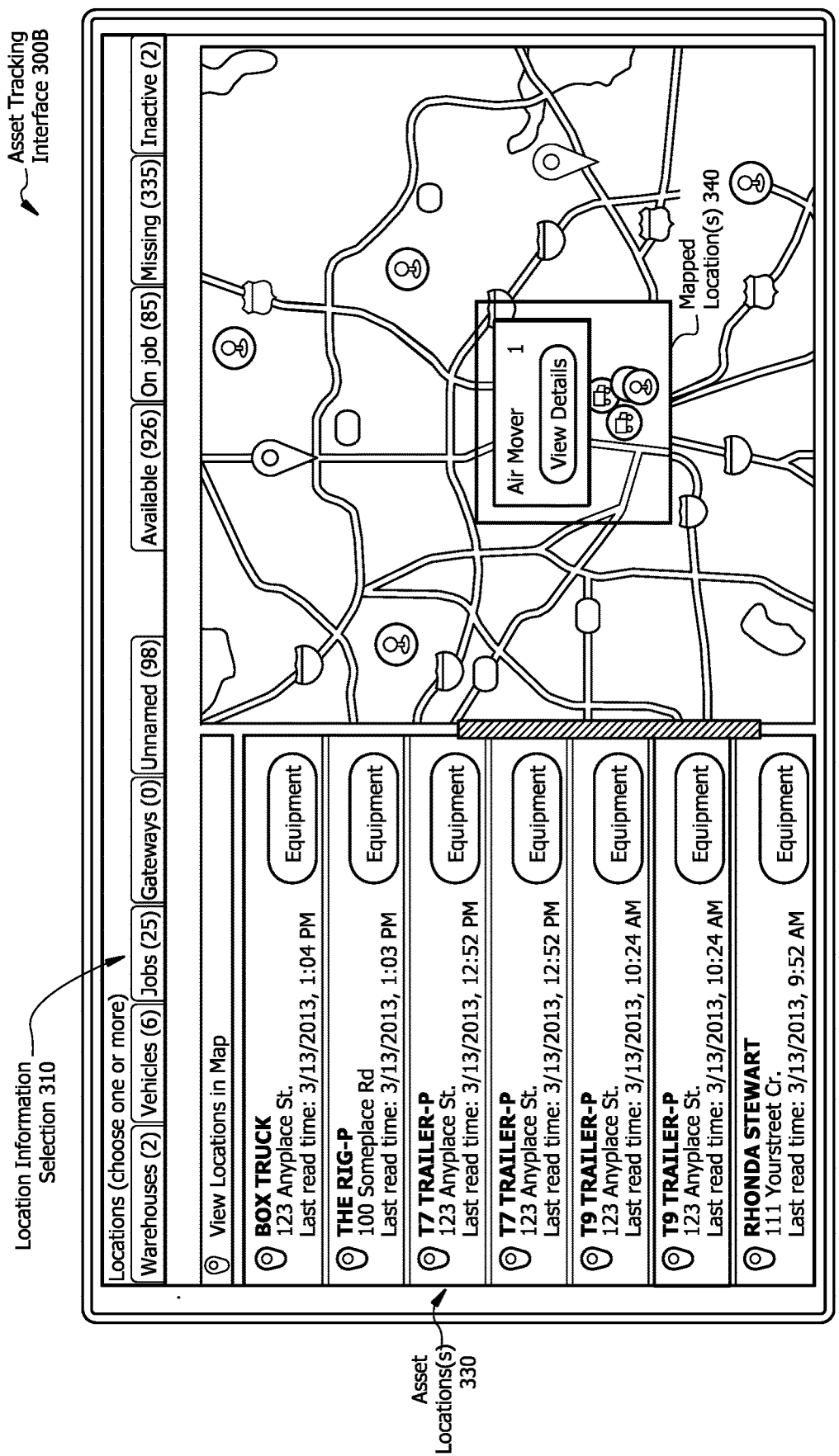
Figure 4A:
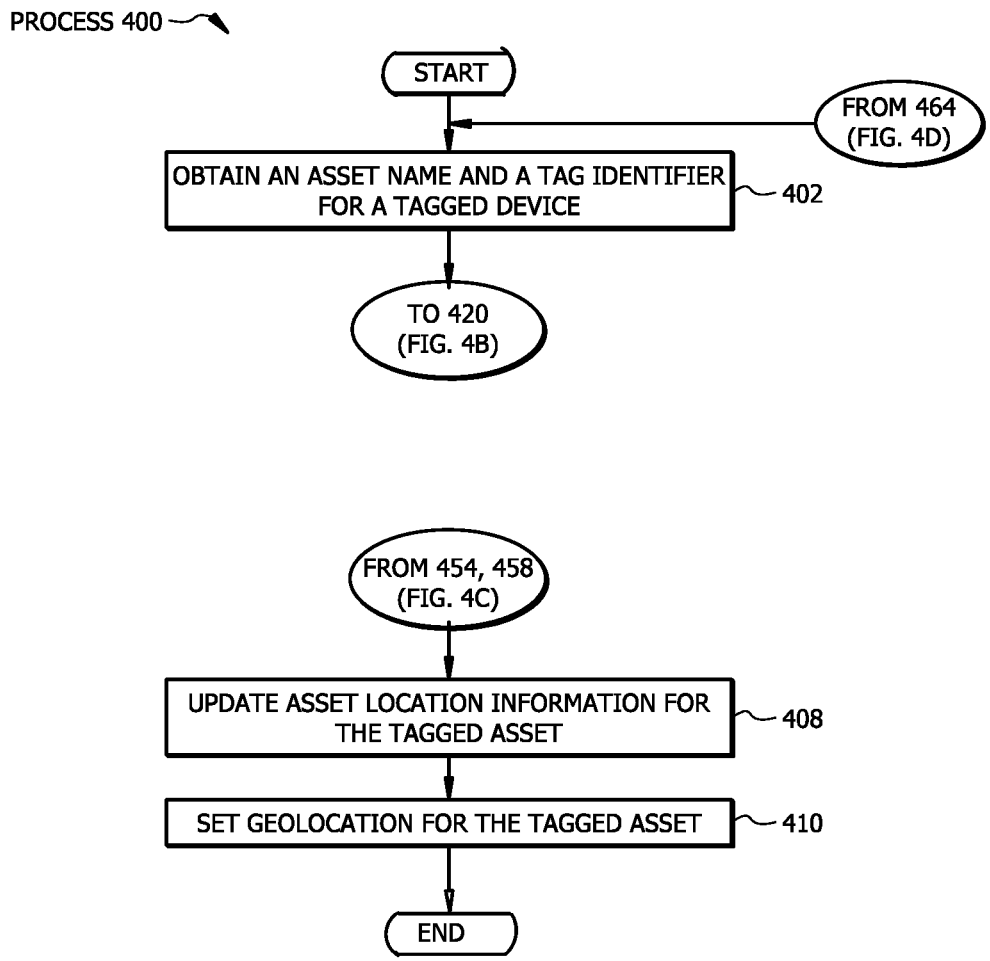
FIGS. 4A-4D illustrate example flowcharts of a method to dynamically monitor location information of assets in a predefined area in accordance with one or more embodiments.

As described above, this disclosure provides various systems and methods to dynamically monitor jobsite assignments for an asset. FIG. 1 illustrates a system 100 in which a server 102 (e.g., an apparatus) is configured to dynamically monitor asset location information 104 of one or more tagged assets 110A-110J in one or more predefined areas 112A-112D. FIG. 2 illustrates one or more operations 200 performed by the system 100 of FIG. 1. FIGS. 3A and 3B illustrate examples of asset tracking interfaces 300A and 300B to visualize the operations 200 of FIG. 2. FIGS. 4A-4D illustrate a process 400 to perform one or more of the operations 200 of FIG. 2. FIGS. 5A-5C illustrate a process 500 to perform one or more of the operations 200 of FIG. 2.

System Overview

FIG. 1 illustrates the system 100 configured to dynamically monitor asset location information 104 of tagged assets 110A-110J (collectively, tagged assets 110) in predefined areas 112A-112D in accordance with one or more embodiments. In the system 100 of FIG. 1, a server 102 may be communicatively coupled to one or more mechanical and/or electronic assets in the predefined areas 112A-112D (collectively, predefined areas 112). The mechanical and/or electronic assets comprise the tagged assets 110 and gateways 114A-114D (collectively, gateways 114). In some embodiments, the tagged assets 110 and the gateways 114 may be configured to exchange data, control, and communication signaling with the server 102 via a network 116. In other embodiments, the server 102 may be located at a same location or at a remote location with respect to any of the predefined areas 112. Further, the predefined areas 112A-112D may be located at a same location or at different locations with respect to one another. In one example, a predefined area 112A may be located at a first location, a predefined area 112B may be located at a second location, a predefined area 112C may be located at a third location, and a predefined area 112D may be located at a fourth location. In another example, the predefined area 112A and the predefined area 112B may be located at the fifth location and the predefined area 112C and the predefined area 112D may be located at a sixth location.

System Components

Server

The server 102 is generally any device that is configured to process data and communicate with computing assets (e.g., the tagged assets 110 and the gateways), databases, systems, and the like, via one or more interfaces (i.e., network or user interface 118). The server 102 may comprise a processor 120 that is generally configured to oversee operations of a processing engine 122. The operations of the processing engine 122 are described further below in conjunction with the system 100 described in FIG. 1, the operations 200 in FIG. 2, the asset tracking interfaces 300A and 300B described in FIGS. 3A and 3B, and the process 400 described in FIGS. 4A-4D.

The server 102 comprises the processor 120 communicatively coupled with the network or user interface 118, and a server memory 124. The server 102 may be configured as shown, or in any other configuration.

The processor 120 comprises one or more processors communicatively coupled to the server memory 124. The processor 120 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 120 may be a programmable logic device, a microcontroller, a microprocessor, or any suitable combination of the preceding. The one or more processor 120 are configured to process data and may be implemented in hardware or software executed by hardware. For example, the processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions 126 from the server memory 124 and executes them by directing the coordinated operations of the ALU, registers and other components. In this regard, the one or more processor 120 are configured to execute various instructions. For example, the one or more processor 120 are configured to execute the instructions 126 to implement the functions disclosed herein, such as some or all of those described with respect to FIGS. 1-4D. In some embodiments, the functions described herein are implemented using logic units, FPGAs, ASICs, DSPs, or any other suitable hardware or electronic circuitry.

In one or more embodiments, the network or user interface 118 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The network or user interface 118 may be configured to support any suitable type of communication protocol as would be appreciated by one of ordinary skill in the art.

In one or more embodiments, the network or user interface 118 may be configured to enable wired and/or wireless communications. The network or user interface 118 may be configured to enable exchange of information between the server 102 and other mechanical and/or electronic assets (i.e., the tagged assets 110 and the gateways 114), systems, or domain(s) via the network 116. For example, the network or user interface 118 may comprise a WIFI interface, a LAN interface, a WAN interface, a modem, a switch, or a router. The processor 120 may be configured to send and receive data using the network or user interface 118. The network or user interface 118 may be configured to use any suitable type of communication protocol. In some embodiments, the communication protocols may be protocols configured to establish connectivity with the network 116.

The server memory 124 may be volatile or non-volatile and may comprise a read-only memory (ROM), random-access memory (RAM), ternary content-addressable memory (TCAM), dynamic random-access memory (DRAM), and static random-access memory (SRAM). The server memory 124 may be implemented using one or more disks, tape drives, solid-state drives, and/or the like. The server memory 124 is operable to store the instructions 126, asset location information 104 comprising location information (e.g., global positioning coordinates 172 indicating latitude and altitude) of the tagged assets 110 (e.g., tagged asset geolocations 128A and 128B) and the gateways 114 (e.g., gateway geolocations 130A and 130B), multiple asset names 132 corresponding to names of the tagged assets 110 and the gateways 114, multiple tag identifications (IDs) 134 corresponding to IDs of tags on each of the tagged assets 110, one or more predefined area geofences 136 indicating geofences comprising geographical coordinates delimiting the predefined areas 112, one or more location rules and policies 140 providing guidelines for the operability of the tagged assets 110 and the gateways 114 in the predefined areas 112, one or more assignments 142, one or more reports 144, and/or any other data or instructions. The instructions 126 may comprise any suitable set of instructions, logic, rules, or code operable to execute the processor 120. In one or more embodiments, the asset names 132 and the tag IDs may be a string of numbers, alphanumeric characters, one or more words or phrases, one or more letters, and/or symbols. The one or more assignments 142 may be jobsite assignments associated with one or more tagged assets that indicate a location of a given tagged asset 110 in a specific geolocation or a specific predefined area 112. The one or more reports 144 may be lists of assignments 142 associated with the given tagged asset 110. The one or more reports 144 may be presented via the network or user interface 118 and/or one or more tagged assets 110.

Network

The network 116 facilitates communication between and amongst the various assets of the system 100. The network 116 may be any suitable network operable to facilitate communication between the server 102, the tagged assets 110, and the gateways 114 of the system 100. The network 116 may include any interconnecting system capable of transmitting audio, video, signals, data, messages, or any combination of the preceding. The network 116 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the assets.

Tagged Assets

In one or more embodiments, any one of the tagged assets 110 may be mechanical devices without a power supply. In this case, any of the components described in reference to the tagged assets 110 may be included or omitted based at least in part upon specific characteristics of the specific asset. For example, a mechanical device (e.g., a wrench) may comprise a tag 150 configured to react to radio-frequency or electro-magnetic signaling from one of the gateways 114 or any other mechanical and/or electric devices in direct or indirect communication with the specific asset. In some embodiments, each of the tagged assets 110 may be any computing device configured to communicate with other devices, such as the server 102 and the gateways 114, other mechanical and/or electronic devices in the predefined areas 112, databases, and the like in the system 100. Each of the tagged assets 110 may be configured to perform specific functions described herein and interact with one or more mechanical and/or electronic devices in the predefined areas 112. Examples of the tagged assets 110 comprise, but are not limited to, laptops, computers, smartphones, tablets, smart devices, Internet-of-Things (IoT) devices, domestic appliances, mechanical tools (e.g., a wrench, a toolkit, a hammer), industrial machinery (e.g., industrial dehumidifiers, carpet cleaners), or any other suitable type of device.

The tagged assets 110 may be hardware configured to create, transmit, and/or receive information. The tagged assets 110 may be configured to receive inputs from a user, process the inputs, and generate data information or command information in response. The data information may include documents or files generated using a graphical user interface (GUI). The command information may include input selections/commands triggered by a user using a peripheral component or one or more asset peripherals 152 (i.e., a keyboard) or an integrated input system (i.e., a touchscreen displaying the GUI). The tagged assets 110 may be communicatively coupled to the server 102 via a network connection (e.g., asset interface 154). The tagged assets 110 may transmit and receive data information, command information, or a combination of both to and from the server 102 via the asset interface 154. In one or more embodiments, the tagged assets 110 are configured to exchange data, commands, and signaling with the server 102 via the network 116. In some embodiments, the tagged assets 110 are configured to connect to at least one of the gateways 114 in one of the predefined areas 112.

In one or more embodiments, while FIG. 1 shows the tagged asset 110A, the tagged asset 110B, the tagged asset 110C, the tagged asset 110D, the tagged asset 110E, the tagged asset 110F, the tagged asset 110G, the tagged asset 110H, the tagged asset 110I, and the tagged asset 110J, the system 100 may comprise less or more tagged assets 110. In FIG. 1, the predefined area 112A is shown as comprising the tagged asset 110A; the predefined area 112B is shown as comprising the tagged asset 110B, tagged asset 110C, and tagged asset 110D; the predefined area 112C is shown as comprising the tagged asset 110E, tagged asset 110F, and tagged asset 110G; and the predefined area 112D is shown as comprising the tagged asset 110H, tagged asset 110I, and tagged asset 110J.

In one or more embodiments, referring to the tagged asset 110A as a non-limiting example of the tagged asset 110, the tagged asset 110A may comprise the tag 150, the one or more asset peripherals 152, the asset interface 154, an asset processor 156, and an asset memory 158 communicatively coupled to one another. The tag 150 may be hardware configured to generate multiple broadcasting signals in accordance with a trigger from the server 102 and/or one of the gateways 114. In the example of FIG. 1, the tag 150 may comprise enable and/or disable tag information 160 corresponding to an enable state in which the tag 150 may generate the broadcasting signals or a disabled state in which the tag 150 may remain idle. The server 102 may change the enable and/or disable tag information 160 to trigger or stop the broadcasting signals from the tag 150. In some embodiments, the broadcasting signals are connectivity signals in which information is transmitted across one or more bandwidths (e.g., narrowband, wideband, or carrier wave transmissions). If with the enable/disable tag information 160 set to "ENABLE," then the tag 150 is enabled or activated to provide absolute or relative location information. As described above, the tag 150 may be an active or a reactive tag. If with the enable/disable tag information 160 set to "DISABLE," then the tag 150 is disabled or deactivated to provide absolute or relative location information.

In some embodiments, the one or more asset peripherals 152 may comprise audio devices (e.g., speaker, microphones, and the like), input devices (e.g., keyboard, mouse, and the like), or any suitable electronic component that may provide a modifying or triggering input to the tagged asset 110A. For example, the one or more asset peripherals 152 may be speakers configured to release audio signals (e.g., voice signals or commands) during media playback operations. In another example, the one or more asset peripherals 152 may be color coded light emission devices (e.g., comprising one or more light-emitting diodes (LEDs)) configured to generate one or more warning or alerts. In one or more embodiments, the one or more asset peripherals 152 may be configured to operate continuously, at predetermined time periods or intervals, or on-demand.

The asset interface 154 may be any suitable hardware or software (e.g., executed by hardware) to facilitate any suitable type of communication in wireless or wired connections. These connections may comprise, but not be limited to, all or a portion of network connections coupled to additional tagged assets 110 and/or gateways 114 in any one of the predefined areas 112, the server 102, the Internet, an Intranet, a private network, a public network, a peer-to-peer network, the public switched telephone network, a cellular network, a LAN, a MAN, a WAN, and a satellite network. The asset interface 154 may be configured to support any suitable type of communication protocol.

The asset processor 156 may comprise one or more processors communicatively coupled to and in signal communication with the asset interface 154, asset peripherals 152, and the asset memory 158. The asset processor 156 is any electronic circuitry, including, but not limited to, state machines, one or more CPU chips, logic units, cores (e.g., a multi-core processor), FPGAs, ASICs, or DSPs. The asset processor 156 may be a programmable logic device, a microcontroller, a microprocessor, or any suitable combination of the preceding. The one or more processors in the asset processor 156 are configured to process data and may be implemented in hardware or software executed by hardware. For example, the asset processor 156 may be an 8-bit, a 16-bit, a 32-bit, a 64-bit, or any other suitable architecture. The asset processor 156 comprises an ALU to perform arithmetic and logic operations, processor registers that supply operands to the ALU, and store the results of ALU operations, and a control unit that fetches software instructions such as asset instructions (not shown) from the asset memory 158 and executes the asset instructions by directing the coordinated operations of the ALU, registers, and other components via an asset processing engine (not shown). The asset processor 156 may be configured to execute various instructions. For example, the asset processor 156 may be configured to execute the asset instructions to implement functions or perform operations disclosed herein, such as some or all of those described with respect to FIGS. 1-4D. In some embodiments, the functions described herein are implemented using logic units, FPGAs, ASICs, DSPs, or any other suitable hardware or electronic circuitry.

Gateways

In one or more embodiments, the gateways 114 comprise data traffic control or routing devices, or end-user devices such as phones, tablets, and any other suitable devices that may be configured to receive, create, process, store, or communicate information, including data packet transmissions. In some embodiments, the gateways 114 are configured to maintain constant or semi-constant communication with the tagged assets 110 in the predefined areas 112. In the example FIG. 1, the gateway 114A may maintain connectivity with the tagged asset 110A in the predefined area 112A; the gateway 114B may maintain connectivity with the tagged asset 110B, the tagged asset 110C, and the tagged asset 110D in the predefined area 112B; the gateway 114C may maintain connectivity with the tagged asset 110E, the tagged asset 110F, and the tagged asset 110G in the predefined area 112C; and the gateway 114D may maintain connectivity with the tagged asset 110H, the tagged asset 110I, and the tagged asset 110J in the predefined area 112D. In some embodiments, the gateways 114 may be configured to be a standalone device or a portion of a larger mechanical and/or electrical device. For example, the gateways 114 may be integrated in other electronic devices performing one or more functions unrelated to those described in reference to the gateways 114. For example, the gateways 114 may be incorporated in a motor vehicle, an appliance, or any other electronic device.

Referring to the gateway 114A as a non-limiting example, the gateway 114A may comprise a gateway interface 162, a gateway processor 164, and a gateway memory 166 communicatively coupled to one another. The gateway interface 162 may be any suitable hardware or software (e.g., executed by hardware) to facilitate any suitable type of communication in wireless or wired connections. These connections may comprise, but not be limited to, all or a portion of network connections coupled to additional tagged assets 110 and/or additional gateways 114 in any one of the predefined areas 112, the server 102, the Internet, an Intranet, a private network, a public network, a peer-to-peer network, the public switched telephone network, a cellular network, a LAN, a MAN, a WAN, and a satellite network. The gateway interface 162 may be configured to support any suitable type of communication protocol. In one or more embodiments, the gateway processor 164 may be configured to route one or more data communication packets between the server 102 and one or more tagged assets 110. The gateway processor 164 may be configured to perform one or more of the operations described in reference to the asset processor 156.

In one or more embodiments, the gateway memory 166 may be configured to perform one or more of the operations described in reference to the asset memory 158. The gateway memory 166 may comprise one or more registered tags 168 configured to identify and monitor any tags (e.g., the tag 150) in the predefined areas 112. The one or more registered tags 168 may be configured to correlate asset names 132 and tag IDs 134 from the server 102 with corresponding tagged assets 110 in the predefined areas 112. Further, the gateway memory 166 may comprise transmission and reception information 170 configured to identify and monitor connectivity associated with the tagged assets 110, and global positioning coordinates 172 indicating an altitude and a latitude of the gateway 114A.

Operational Flow Overview

FIG. 2 illustrates an example of one or more operations 200 implemented by the system 100 of FIG. 1, in accordance with one or more embodiments. While one or more of the operations 200 are shown to be performed by the server 102, the gateways 114, and the tagged assets 110, additional electronic devices or components in the server 102 (e.g., the processor 120) or in a network element (not shown) may be configured to perform one or more of the operations 200. In the example of FIG. 2, the server 102 is shown communicatively coupled to multiple mechanical and electronic devices in the predefined areas 112 via the network 116.

In the predefined area 112B, the server 102 is shown communicatively coupled to the gateway 114B, the tagged asset 110B, and the tagged asset 110C. Further, the gateway 114B is shown comprising a communication link 202 with the tagged asset 110B, comprising a communication link 204 with the tagged asset 110C, and generating a reconnection link 206 to reach the tagged asset 110D. The gateway 114B may be configured to retrieve location information and monitor the tagged asset 110B and the tagged asset 110C via the communication link 202 and the communication link 204, respectively. In some embodiments, while the tagged asset 110C is shown to comprise a tag 208, the tagged asset 110B and the tagged asset 110D may comprise corresponding tags internally (e.g., similar to the tag 150). In the example of FIG. 2, the predefined area 112B may be a jobsite (e.g., a well site, a clean-up site after a natural disaster) or a warehouse in which operations are performed using the tagged assets 110B-110D. In some embodiments, the reconnection link 206 may be generated in response to the gateway 114B identifying one or more broadcasted signals from the tagged asset 110D in the predefined area 112B during a listening period. The listening period may be dynamically triggered or preconfigured to have a listening time duration. For example, the listening period may be dynamically controlled to last a first duration if the predefined area 112B is in a first type of area (e.g., the predefined area 112B is in a remote jobsite in an area surrounded by mountains) or a second duration if the predefined area 112B is in a second type of area (e.g., the predefined area 112B is in a warehouse with multiple broadcasting electronic devices).

In the predefined area 112C, the server 102 is shown communicatively coupled to the gateway 114C, the tagged asset 110E, and the tagged asset 110G. Further, the gateway 114C is shown comprising a communication link 212 with the tagged asset 110E, generating a reconnection link 214 to reach the tagged asset 110F, and comprising a communication link 216 with the tagged asset 110G. The gateway 114C may be configured to retrieve location information and monitor the tagged asset 110E and the tagged asset 110G via the communication link 212 and the communication link 216, respectively. In some embodiments, while the tagged asset 110F is shown to comprise a tag 218, the tagged asset 110E and the tagged asset 110G may comprise corresponding tags internally (e.g., similar to the tag 150). In the example of FIG. 2, the predefined area 112C may be a jobsite (e.g., a well site, a clean-up site after a natural disaster) or a warehouse in which operations are performed using the tagged assets 110E-110G.

In the predefined area 112D, the server 102 is shown communicatively coupled to the gateway 114D, the tagged asset 110H, the tagged asset 110I, and the tagged asset 110J. Further, the gateway 114D is shown comprising a communication link 222 with the tagged asset 110H, comprising a communication link 224 with the tagged asset 110I, and comprising a communication link 226 with the tagged asset 110J. The gateway 114D may be configured to retrieve location information and monitor the tagged assets 110H-110J via the communication links 222-226, respectively. In the example of FIG. 2, the predefined area 112D may be a motor vehicle (e.g., a truck or moving trailer) carrying equipment between jobsites using the tagged assets 110H-110J. Further, the predefined area 112D comprises a tagged asset 110K and a tagged asset 110L. In some embodiments, while the tagged asset 110K and the tagged asset 110L are not shown comprising communication links with the gateway 114D, the gateway 114D may generate new reconnection links to establish a communication link with the tagged asset 110K or the tagged asset 110L. For example, the gateway 114D may be in a motor vehicle carrying the tagged assets 110H-110J. In this example, the predefined area 112D may be movable or stationary based at least in part upon a location of the motor vehicle. In this regard, the gateway 114D may be configured to search for any tagged assets 110 in a given location after the motor vehicle stops. In this search, the gateway 114D may transmit one or more reconnection links (e.g., reconnection links not shown to the tagged asset 110K and the tagged asset 110L) and determine whether any assets are found in the predefined area 112D. The tagged asset 110K and the tagged asset 110L may operate normally even if these tagged assets 110 do not show communication links established with the closest gateway 114.

In a predefined area 112E, the server 102 is shown communicatively coupled to a supplemental gateway 250. Further, the predefined area 112E comprises a tagged asset 110O and a tagged asset 110P. In the example of FIG. 2, the predefined area 112E may be a jobsite (e.g., a well site, a clean-up site after a natural disaster) or a warehouse in which operations are performed using the tagged assets 110M and 110N. In some embodiments, while the tagged asset 110M and the tagged asset 110N are not shown comprising communication links with the supplemental gateway 250, the supplemental gateway 250 may generate new reconnection links to establish a communication link with the tagged asset 110M or the tagged asset 110N. The tagged asset 110M and the tagged asset 110N may operate normally even if these tagged assets 110 do not show communication links established with the supplemental gateway 250. In some embodiments, the supplemental gateway 250 may be a mobile device of an operator performing one or more of the operations described in reference to the gateways 114.

In one or more embodiments, the operations 200 are configured to dynamically monitor the location of tagged assets 110 automatically. The tagged assets 110 may be configured to advertise packets that are read by the gateways 114 in one of multiple predefined areas 112 (e.g., warehouses, motor vehicles). Any tagged assets 110 that are not reported into any of the gateways may be flagged as being located at an unknown location. These tagged assets 110 may be reported as being missing. An alert for these tagged assets 110 may indicate any respective last known locations. In one or more embodiments, when a job is created, a predefined area geofence 136 may be created which may allow the tagged assets 110 to be scanned and associated with an inventory of a jobsite at the completion of a job and make sure location information for each asset is monitored. If the location of the tagged assets 110 is not known, the server 102 may alert jobsite personnel (e.g., operators or contractor) to return to the specific predefined area where the tagged assets were last located.

Request Location Information for Tagged Assets

In one or more embodiments, the operations 200 comprise requesting location information for one or more tagged assets 110 in a given predefined area 112. The server 102 may be configured to retrieve information (e.g., the asset names 132 and the tag IDs 134) for each of the tagged assets 110 in the predefined areas 112. In some embodiments, the operations 200 comprise obtaining a first tag ID of the tag IDs 134 and a first asset name of the asset names 132 associated with a first tagged asset 110 (e.g., any one of the tagged assets 110). Further, the operations 200 may comprise determining whether the asset location information 104 comprises first global positioning coordinates 172 of the first tagged asset 110. In some embodiments, in response to determining that the asset location information 104 comprises the first global positioning coordinates 172, the operations 200 may comprise determining whether the first tagged asset 110 is located in a first predefined area 112 based at least in part upon matching (i.e., overlap) the first global positioning coordinates 172 to a first geofence of the predefined area geofences 136. In response to determining that the first tagged asset 110 is located in the first predefined area 112, the operations 200 may comprise generating a first update indicating that the first tagged asset 110 is located in the first predefined area 112 and, in response to determining that the asset location information 104 does not comprise the first global positioning coordinates 172, generating an alert indicating that the first tagged asset 110 is not located in the first predefined area 112. In other embodiments, the global positioning coordinates 172 may be pre-configured for a given tagged asset 110 such that the asset location information 104 is known without receiving confirmation from the given tagged asset 110. In yet other embodiments, in conjunction with determining that the asset location information 104 comprises the first global positioning coordinates 172, trigger an output of the first tagged asset 110 to indicate operations of the first tagged asset 110.

Determine Location Information for Tagged Assets Based on Gateway Scans

In one or more embodiments, the server 102 may be configured to determine the location of the tagged assets 110 based at least in part upon scans performed by one or more gateways 114. At this stage, the server 102 may be configured to determine whether any one of the gateways 114 is identified to be in proximity to the tagged assets 110. In some embodiments, the operations 200 comprise determining whether the first tagged asset 110 is coupled to a first gateway 114. In response to determining that the first tagged asset 110 is coupled to the first gateway 114, the operations 200 comprise identifying a first gateway location (e.g., gateway geolocation 130A). In some embodiments, the operations 200 comprise determining whether the asset location information 104 comprise second global positioning coordinates 172 of the first gateway 114. In response to determining that the asset location information 104 comprises the second global positioning coordinates 172, the operations 200 comprise determining whether the first tagged asset 110 is located in a second predefined area 112 based at least in part upon matching the second global positioning coordinates 172 to a second geofence of the plurality of geofences 136. In response to determining that the first tagged asset 110 is located in the second predefined area 112, the operations 200 comprise generating a second update indicating that the first tagged asset 110 is located in the second predefined area 112.

In other embodiments, the operations 200 comprise determining whether the first tagged asset 110 is coupled to a first gateway 114. In conjunction with determining that the first tagged asset 110 is not coupled to the first gateway 114, the operations 200 comprise determining whether the first tagged asset 110 is scanned within a threshold period of time. In response to determining that the first tagged asset 110 is not scanned within the threshold period of time, the operations 200 comprise identifying as unknown with a current location of the first tagged asset 110. In conjunction with identifying as unknown the current location of the first tagged asset 110, the operations 200 comprise retrieving a last known location of the first tagged asset 110. In some embodiments, the gateway 114 may transmit a location request (e.g., reconnection link 206) to the first tagged asset 110 at the last known location of the first tagged asset 110 in an attempt to establish a communication link (e.g., communication link 202). In a case when the first tagged asset 110 is unresponsive, generate the alert to a second gateway 114 located within a threshold distance from the last known location of the first tagged asset 110. The alert may indicate the last known location of the first tagged asset 110 and that the first tagged asset 110 is not located in the first predefined area 112.

Estimate Location Information for Tagged Assets Based on Supplemental Gateway Scans In one or more embodiments, in the event that the first tagged asset 110 is not found within any of the predefined areas 112, the operations 200 comprise estimating the asset location information 104 of the first tagged asset 110. In conjunction with determining that the first tagged asset 110 is missing in the asset location information 104, the operations 200 comprise determining whether the first tagged asset 110 is coupled to a first gateway 114. In conjunction with determining that the first tagged asset 110 is coupled to the first gateway 114, the operations 200 comprise determining whether the first tagged asset 110 is scanned within a threshold period of time. In response to determining that the first tagged asset 110 is scanned within the threshold period of time, the operations 200 comprise determining whether the first tagged asset 110 is scanned by a second gateway. At this stage, in response to determining that the first tagged asset 110 is not scanned by the second gateway 114, the operations 200 comprise identifying a supplemental gateway location (e.g., the predefined area 112E for the supplemental gateway 250) as a current location (e.g., updating the asset location information 104) of the first tagged asset 110.

Dynamically Monitor Jobsite Assignments for an Asset

In one or more embodiments, the operations 200 comprise obtaining last known location information 104 associated with a given tagged asset 110. At this stage, the operations 200 may comprise evaluating whether the last known location information 104 associated with the given tagged asset 110 corresponds to a jobsite location (i.e., one of the predefined areas 112). Further, the operations 200 may comprise determining whether an updated location information 104 of the tagged asset 110 is within a threshold distance of the last known location information 104 associated with the tagged asset 110. The updated asset location information 104 may comprise possible updates to the existing asset location information 104. The jobsite location may be a trusted location in which the given tagged asset 110 is expected to perform one or more operations. The given tagged asset 110 may be assigned to the jobsite location after the given tagged asset 110 is determined to be at the jobsite location over a predetermined time duration. In this regard, jobsite assignments 142 for the given tagged asset 110 may be updated or may remain the same over time based at least in part upon one or more changes in location information 104. For example, the given tagged asset 110 may be associated with a first jobsite assignment 142 after the asset location information 104 of the given tagged asset 110 is determined to be at a first jobsite location and the given tagged asset 110 may be associated with a second jobsite assignment 142 after the asset location information 104 of the given tagged asset 110 is determined to be at a second jobsite location.

In one or more embodiments, the operations 200 comprise generating one or more reports 144 configured to provide a list of jobsite locations to which the given tagged asset 110 is associated with over a predefined period of time. In some embodiments, the reports 144 may comprise a cost associated to the tagged asset 110 based at least in part a jobsite location. The reports 144 may be generated on demand, dynamically, or periodically. In some embodiments, the reports 144 may be generated upon determining that the tagged asset 110A is no longer associated with a predefined geofence or that the tagged asset 110A does not comprise a jobsite assignment. For example, the reports 144 may be generated to close records associated with a given jobsite once all tagged assets 110A associated with the given jobsite are determined to be removed from the geolocations associated with the given jobsite for a predetermined period of time (i.e., hours, days, weeks, and the like).

Example Asset Tracking Interfaces

FIGS. 3A and 3B illustrate examples of visualization interfaces in accordance with one or more embodiments. In particular, FIG. 3A illustrates an asset tracking interface 300A comprising a first visualization of the tagged assets 110. In the asset tracking interface 300A, the tagged assets 110 are shown in relation with location information selection 310, one or more registered assets 320, and one or more asset locations 330. Further, FIG. 3B illustrates an asset tracking interface 300B comprising a second visualization of the tagged assets 110. In the asset tracking interface 300B, the tagged assets 110 are shown in relation with the location information selection 310, the one or more asset locations 330, and one or more mapped locations 340.

In the example of FIG. 3A, the location information selection 310 may indicate one or more filters to visualize the tagged assets 110. These filters may comprise a first filter to visualize tagged assets 110 based at least in part upon proximities to warehouses, a second filter to visualize tagged assets 110 based at least in part upon proximities to in registered motor vehicles, a third filter to visualize tagged assets 110 based at least in part upon proximities to jobsites, a fourth filter to visualize tagged assets 110 based at least in part upon proximities to gateways 114, and a fifth filter to visualize tagged assets 110 based at least in part upon whether the tagged assets 110 are unassigned to a predefined filter. Further, the location information selection 310 may enable or disable visualization for available tagged assets 110, inactive tagged assets 110, tagged assets 110 located at jobsites, and/or tagged assets with unknown locations or showing as "missing".

In some embodiments, the asset tracking interface 300A shows the registered assets 320 in a horizontal set of selectable parameters. In other embodiments, the asset tracking interface 300A shows the asset locations 330 in a vertical set of selectable parameters. The asset locations 330 are shown as street addresses in the real world. Alternatively, the asset locations 330 may be shown as geographical coordinates indicating latitude and altitude of the tagged assets 110 on Earth. In the asset tracking interface 300A, numbers in the cross-section of the registered assets 320 and the asset locations 330 shown in FIG. 3A indicate a number of a specific type of tagged asset 110 located at a given asset location 330.

In the asset tracking interface 300A of FIG. 3A, a grid is shown comprising multiple buckets in which the registered assets 320 and the asset locations 330 connect. Each of these buckets are shown indicating a number of the registered assets 320 at each given asset location 330. In some embodiments, the bucket may comprise a cost associated with registered asset 320 while tagged assets 110 are located a given asset location 330. For example, ten registered assets 320 under the "Axial Air Mover 0.25-0.5 HP" located at the asset location 330 labeled "BOX TRUCK" may comprise a cost of 100 dollars per day. In this case, the ten registered assets 320 may indicate that a cost associated with this bucket adds up to a cost of 1,000 dollars per day. In some embodiments, information associated with the costs of the registered assets 320 for one or more asset locations 330 may be included in the reports 144. Further, the information associated with the costs of the registered assets 320 for one or more asset locations 330 may be identified at a glance in the asset tracking interface 300A.

In the example of FIG. 3B, the location information selection 310 may indicate one or more filters to visualize the tagged assets 110. These filters may comprise the same filters described in reference to FIG. 3B. In some embodiments, the asset tracking interface 300B shows the asset locations 330 in a vertical set of selectable parameters. The asset locations 330 are shown as street addresses in the real world. Alternatively, the asset locations 330 may be shown as geographical coordinates indicating latitude and altitude of the tagged assets 110 on Earth. In the asset tracking interface 300B, one or more mapped locations 340 are shown as locations in a map. Each of the asset locations 330 may be pinned to the map along with a visual representation of a location type corresponding to the filters in the location information selection 310. For example, an item labeled "Air Mover" is shown as being last scanned by a gateway 114 located at a motor vehicle. As shown, the item may enable additional details to be shown. These additional details may comprise a corresponding asset name 132 or tag ID 134 associated with the asset.

In the asset tracking interface 300B of FIG. 3B, users may add labels to the tagged assets 110. In this regard, the labels may be visualized in a map view, a table view, and a list view. For example, a user may keep certain tagged assets 110 in a first predefined area 112 (i.e., warehouse A) and other tagged assets 110 in a second predefined area 112 (i.e., warehouse B). In this regard, the user may label the tagged assets 110 in accordance with their location, which may be supposed to be in a specific warehouse. The tagged assets 110 and corresponding labels may be configured to be presented in the asset tracking interface 300B.

Example Processes

FIGS. 4A-4D illustrate an example flowchart of a process 400 and FIGS. 5A-5C illustrate an example flowchart of a process 400 in accordance with one or more embodiments. Modifications, additions, or omissions may be made to the process 400 or the process 500. The process 400 or the process 500 may comprise more, fewer, or other operations than those shown below. For example, operations may be performed in parallel or in any suitable order. While at times discussed as the server 102, the gateways 114, the tagged assets 110, or components of any mechanical and/or electronic device thereof, any suitable system or components of the system 100 may perform one or more operations of the process 400 or the process 500. For example, one or more operations of the process 400 or the process 500 may be implemented, at least in part, in the form of instructions 126 of FIG. 1, stored on non-transitory, tangible, machine-readable media (e.g., the server memory 124 of FIG. 1) that when run by one or more processors (e.g., the processor 120 of FIG. 1) may cause the one or more processors to perform operations described in operations 402-464 or operations 502-534.

Example Process to Dynamically Monitor Location Information of Assets in a Predefined Area FIGS. 4A-4D illustrate an example flowchart of a process 400 to dynamically monitor asset location information 104 of tagged assets 110 in one or more predefined areas 112, in accordance with one or more embodiments. Referring to the tagged asset 110A as a non-limiting example, the process 400 starts at operation 402, where the server 102 obtains an asset name (e.g., from the asset names 132) and a tag ID (e.g., from the tag IDs 134) for the tagged asset 110A. At this stage, the process 400 proceeds to operation 420 in FIG. 4B. As it is described in detail in FIGS. 4B and 4C, the process 400 determines current asset location information 104 for the tagged asset 110A.

At operation 408, the server 102 updates the asset location information 104 for the tagged asset 110A based at least upon whether existing location information or new location information is identified for the tagged asset 110A. At operation 410, the server 102 sets the geolocation for the tagged asset 110 as an existing location or a new location. From operation 410, the process 400 may continue to operation 402.

Figure 4B:
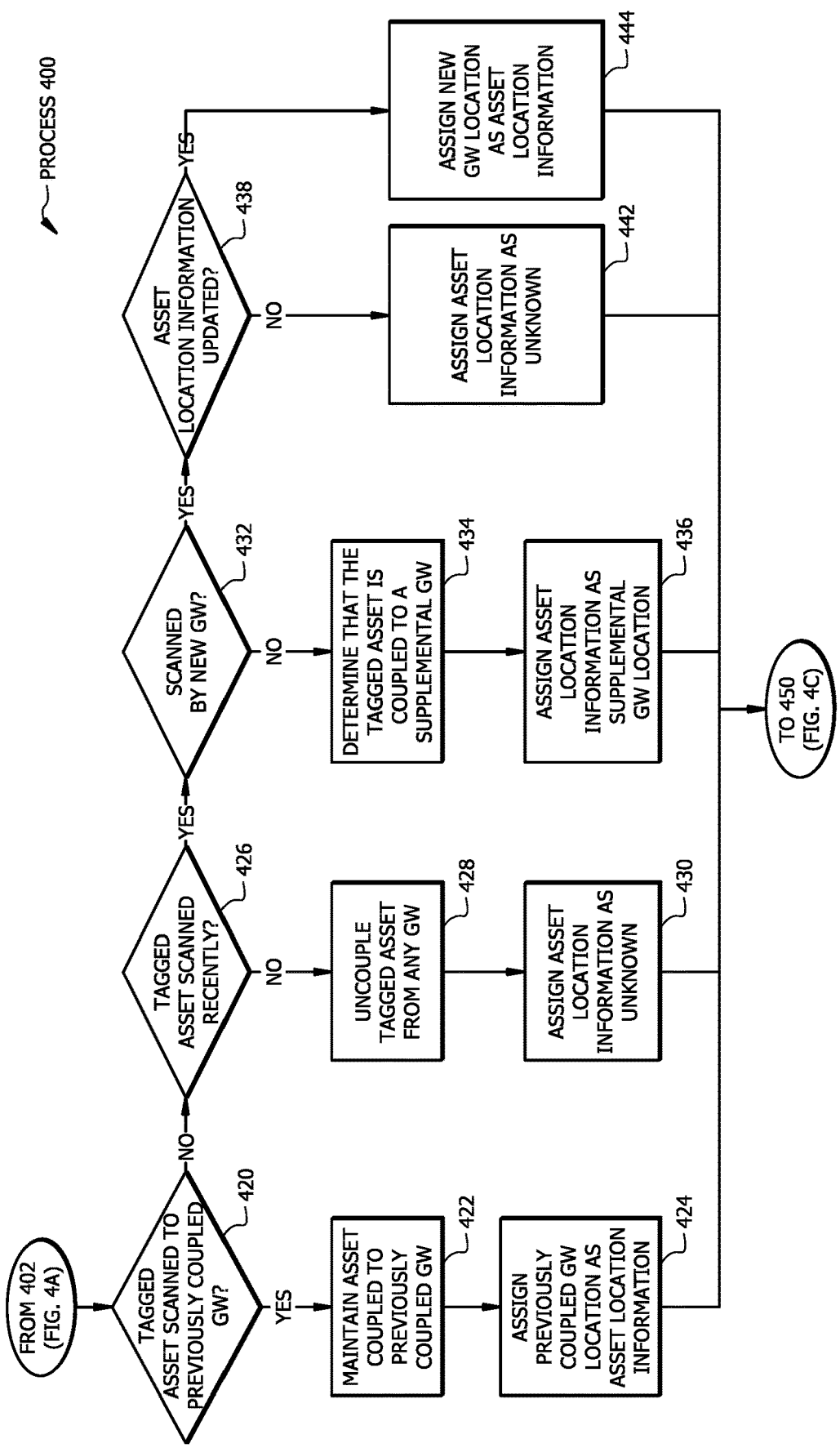
Figure 5A:
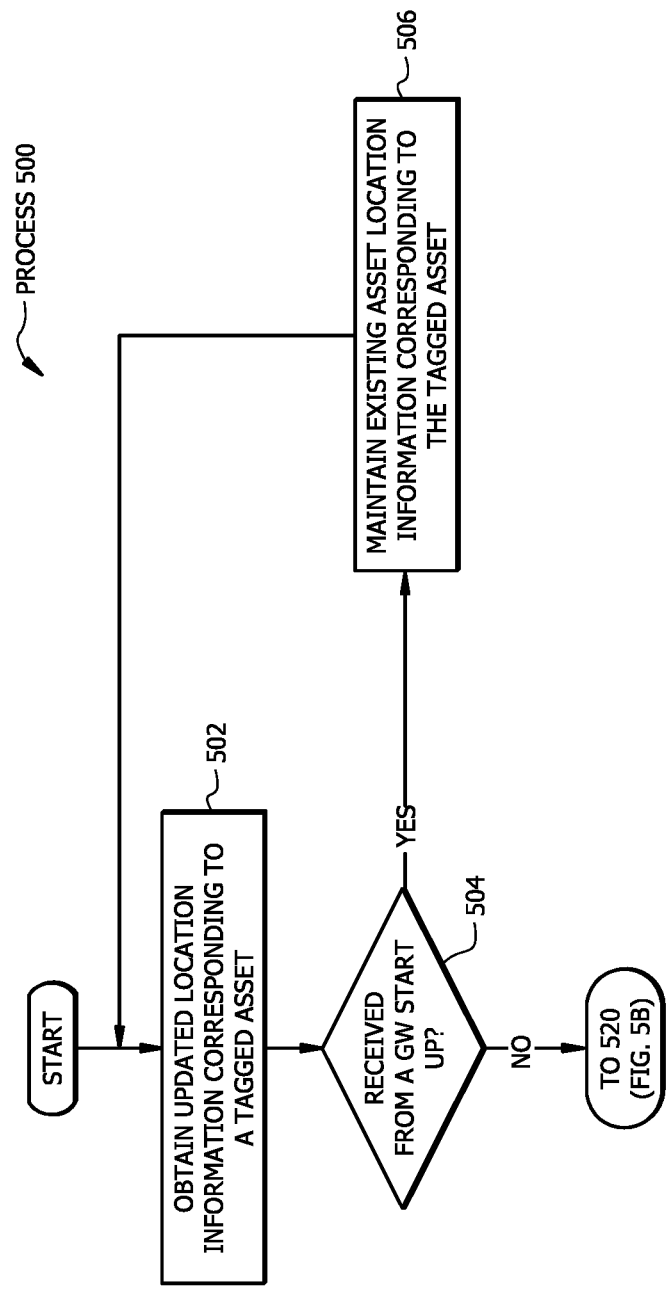
FIGS. 5A-5C illustrate example flowcharts of a method to dynamically monitor jobsite assignments for an asset in accordance with one or more embodiments.
Figure 5B:
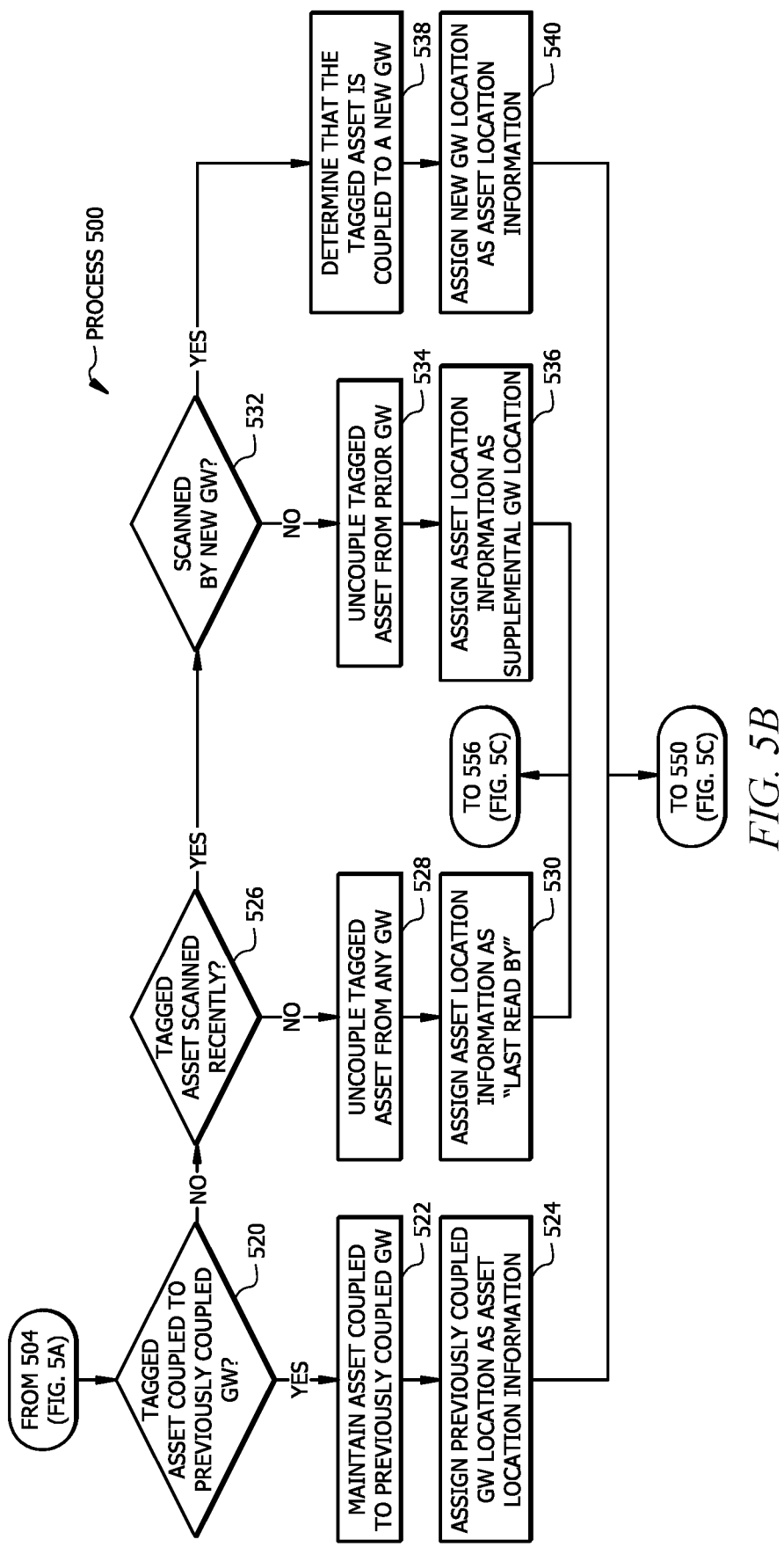
Figure 5C:
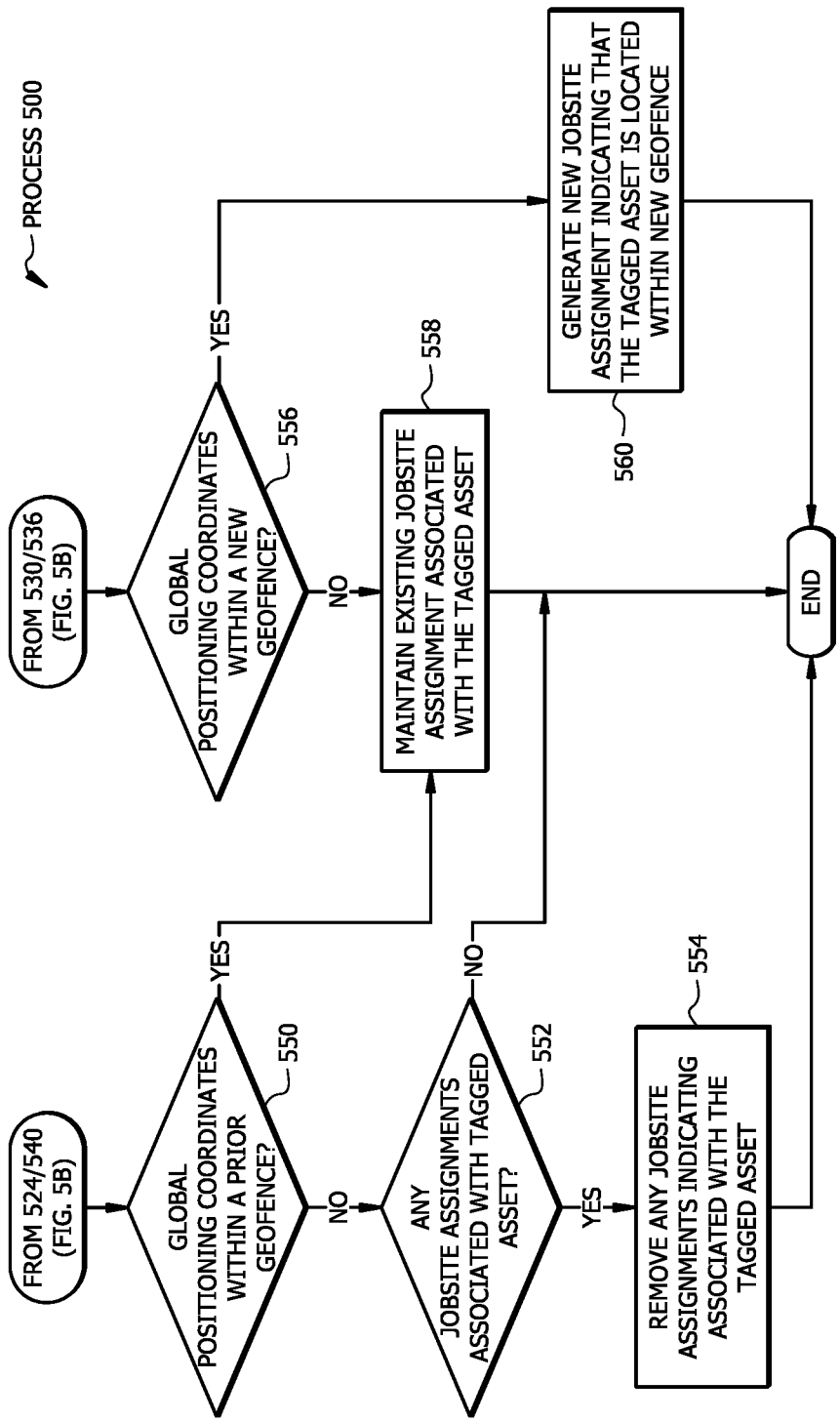

Turning to FIG. 4B, the process 400 continues at operation 420 where the process 400 determines whether the tagged asset 110A is scanned by a previously coupled gateway 114. If the server 102 determines that the tagged asset 110A is coupled to one of the previously coupled gateway 114 (e.g., YES), then the process 400 proceeds to operation 422. If the server 102 determines that the tagged asset 110A is not coupled to one of the previously known gateway 114 (e.g., NO), then the process 400 proceeds to operation 426.

At operation 422, the server 102 may be configured to maintain the tagged asset 110A coupled to the previously coupled gateway (e.g., the gateway 114A). At operation 424, the server 102 may be configured to assign a known location of the previously coupled gateway 114 as the asset location information 104 for the tagged asset 110A. In this regard, if the server 102 comprises the gateway geolocation 130A for the gateway 114A, the server 102 may assign the gateway geolocation 130A as the tagged asset geolocation 128A for the tagged asset 110A.

At operation 426, the server 102 may be configured to determine whether the tagged asset 110A has been scanned recently. In this regard, the server 102 may determine whether the tagged asset 110A has been scanned by one of the gateways 114. If the server 102 determines that the tagged asset 110A has been scanned recently (e.g., YES), then the process 400 proceeds to operation 432. If the server 102 determines that the tagged asset 110A has not been scanned recently (e.g., NO), then the process 400 proceeds to operation 428. At operation 428, the server 102 provides an instruction to uncouple the tagged asset 110A from any of the gateways 114. At operation 430, the server 102 may be configured to assign the asset location information 104 for the tagged asset 110A as unknown.

At operation 432, the server 102 may determine whether the tagged asset 110A is scanned by a new gateway 114B. If the server 102 determines that the tagged asset 110A is scanned by a new gateway 114B (e.g., YES), then the process 400 proceeds to operation 438. If the server 102 determines that the tagged asset 110A is not scanned by a new gateway 114B (e.g., NO), then the process 400 proceeds to operation 434. At operation 434, the server 102 may be configured to determine that the tagged asset 110A is coupled to a supplemental gateway (e.g., the supplemental gateway 250). At operation 436, the server 102 be configured to assign the asset location information 104 for the tagged asset 110A as the supplemental gateway location.

At operation 438, the server 102 may be configured to determine whether the asset location information 104 is updated. If the server 102 determines that the asset location information 104 is updated (e.g., YES), then the process 400 proceeds to operation 444. If the server 102 determines that the asset location information 104 is not updated (e.g., NO), then the process 400 proceeds to operation 442. At operation 442, the server 102 may be configured to assign asset location information 104 as unknown. At operation 444, the server 102 may be configured to assign a new gateway location as the asset location information 104 for the tagged asset 110.

In one or more embodiments, the server 102 may be configured to determine whether the tagged asset 110A is scanned by a known gateway 114 (e.g., the gateway 114A). The tagged asset 110A may remain stuck to the gateway 114A if the tagged asset 110A is scanned by the gateway 114A. The server 102 may be configured to determine whether the tagged asset 110A has been scanned since the last time the tagged asset 110A was scanned. The tagged asset 110A may be released from any previous gateways 114 if the tagged asset 110A has not been scanned. In some embodiments, the server 102 may determine whether the tagged asset is scanned by a supplemental gateway (e.g., the supplemental gateway 250) to further estimate the asset location information 104 associated with the tagged asset 110A.

Figure 4C:
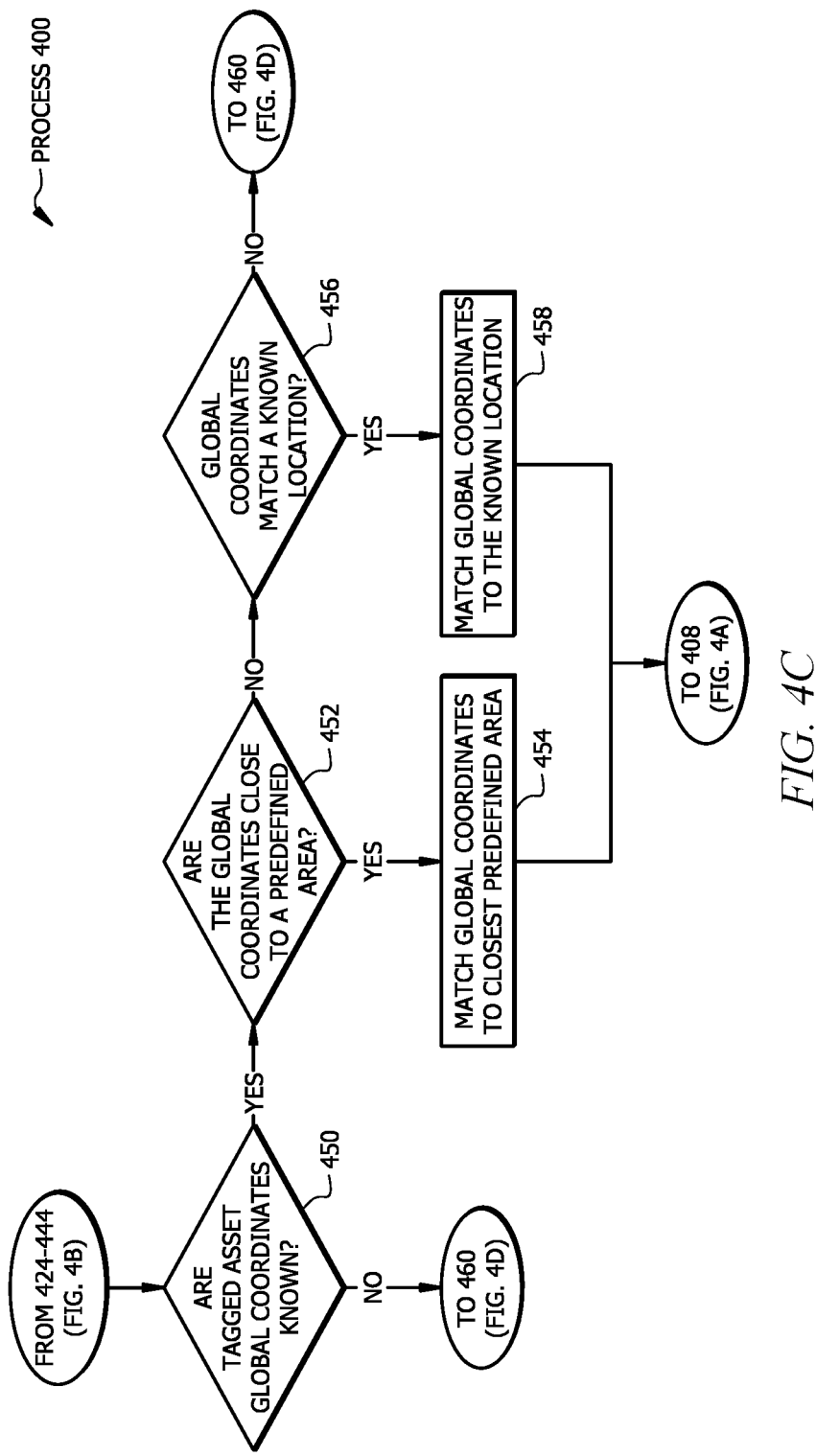

Turning to FIG. 4C, the process 400 continues at operation 450 from the operations 424, 430, 436, 442, or 444 in FIG. 4B. At operation 450, after the relevant asset location information 104 is updated, the server 102 may be configured to determine whether the global positioning coordinates 172 are known for the tagged asset 110A. If the server 102 determines that the global positioning coordinates 172 are known for the tagged asset 110A (e.g., YES), then the process 400 proceeds to operation 452. If the server 102 determines that the global positioning coordinates 172 are not known for the tagged asset 110A (e.g., NO), then the process 400 proceeds to operation 460 in FIG. 4D.

At operation 452, the server 102 may be configured to determine whether the global positioning coordinates 172 are close in proximity to one of the predefined areas 112. If the server 102 determines that the global positioning coordinates 172 are far in proximity to at least one of the predefined areas 112 (e.g., NO), then the process 400 proceeds to operation 456. If the server 102 determines that the global positioning coordinates 172 are close in proximity to at least one of the predefined areas 112 (e.g., YES), then the process 400 proceeds to operation 454. At operation 454, the server 102 may be configured to match the global positioning coordinates 172 to the closest predefined area 112. For example, if the global positioning coordinates 172 of the tagged asset 110A are close in proximity to the predefined area 112C, the server 102 may infer that the tagged asset 110A is in the predefined area 112C.

At operation 456, the server 102 may be configured to determine whether the global positioning coordinates 172 match a known location. For example, the server 102 may access a data repository (not shown) in the server memory 124 or in the network 116 to determine whether the location or the address is known for the global positioning coordinates 172. If the server 102 determines that the global positioning coordinates 172 do not match a known location (e.g., NO), then the process 400 proceeds to operation 460 in FIG. 4D. If the server 102 determines that the global positioning coordinates 172 match a known location (e.g., YES), then the process 400 proceeds to operation 458. At operation 458, the server 102 may be configured to match the global positioning coordinates 172 of the tagged asset 110A to the known location. For example, if the global positioning coordinates 172 of the tagged asset 110A are determined to match a street address of a specific gas station, the server 102 may infer that the tagged asset 110A is located at the specific gas station.

Figure 4D:
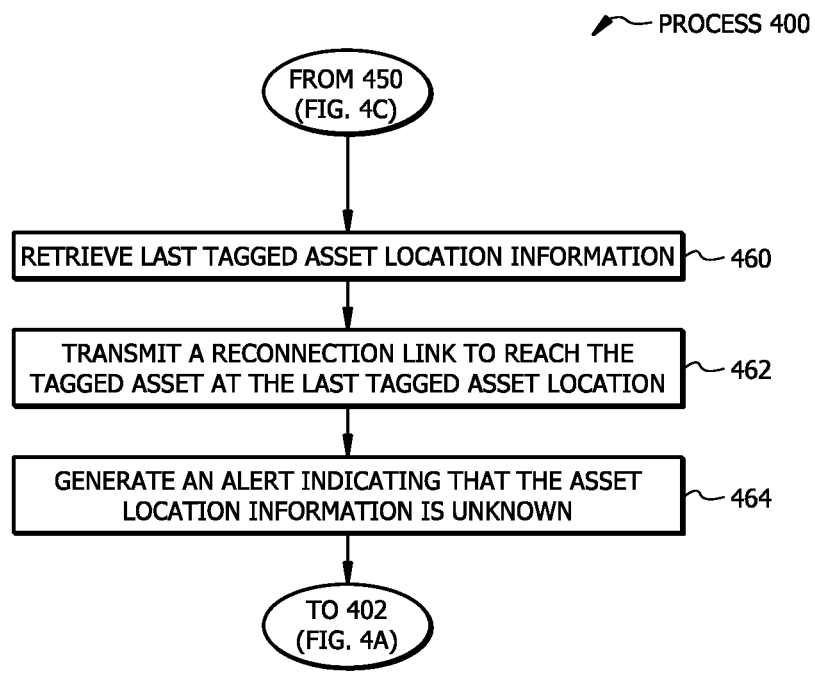

Turning to FIG. 4D, the process 400 continues at operation 460 from the operation 412 in FIG. 4A or the operations 450 and 456 in FIG. 4C. At operation 460, the server 102 may retrieve the last known asset location information 104 for the tagged asset 110A. At operation 462, the server 102 or one of the gateways 114 may be configured to transmit a geological request to reach the tagged asset 110A at the last known location for the tagged asset 110A. As shown and described in reference to FIG. 2, the reconnection links 206, 214, 232, or 234 to reach one or more of tagged assets without corresponding updated asset location information 104. At operation 464, the server 102 or the gateway 114A may be configured to generate an alert indicating that the asset location information 104 is unknown. The alert may be triggered by the server 102 and shared with multiple user devices, one or more additional gateways 114, and/or one or more additional tagged assets 110. In some embodiments, the alert may comprise visual alerts (e.g., blinking lights), audible alerts (e.g., siren sounds), tactile alerts (e.g., vibrations), or a combination of the preceding alerts.

In one or more embodiments, the server 102 is configured to dynamically provide jobsite assignments 142 to the tagged assets 110 based on updated location information of the tagged assets 110. The server 102 may automatically determine a jobsite assignment 142 for a given tagged asset 110 based on a relative or exact location of the tagged asset 110 at a given time. In this regard, a tagged asset 110 may be monitored in transitions between transportation vehicles and one or more different jobsite locations. For example, a tagged asset 110 may be monitored by a gateway 114 onboard a truck transporting the tagged asset 110. The server 102 may assign the tagged asset 110 to a jobsite location upon determining that the tagged asset 110 is used at a jobsite location where the truck stopped. The server 102 may make this determination by identifying that the tagged asset 110 received updated asset location information 104 from a new gateway 114. The server 102 may determine that the tagged asset is part of the operations performed at the jobsite location by determining that the tagged asset 110 is receiving location updates from a gateway 114 associated with the jobsite location or by determining that the truck has driven away from the jobsite location. Similarly, the server 102 may determine that the tagged asset 110 has left the jobsite location upon determining that the tagged asset 110 is receiving updated asset location information 104 from a new gateway 114 onboard a new truck or by determining that the tagged asset 110 has moved to a location associated with a new jobsite location. In some embodiments, the server 102 may automatically determine that the jobsite location is closed based on determining that there are no tagged assets 110 left in the jobsite location.

Example Process to Dynamically Monitor Jobsite Assignments for an Asset

FIGS. 5A-5C illustrate an example flowchart of a process 500 to dynamically monitor jobsite assignments 142 of a tagged asset 110, in accordance with one or more embodiments. The operations described with respect to FIGS. 5A-5C may be performed by one or more components illustrated and described in conjunction with FIGS. 1-2, 3A-3B, and 4A-4D. In the non-limiting examples of FIGS. 5A-5C, the process includes evaluating asset location information 104 associated with one or more of the tagged assets 110. For each tagged asset 110, the server 102 determines whether asset location information 104 is received in response to one or more start-up operations of a gateway. The asset location information 104 may be dismissed if the server 102 determines that the asset location information 104 was received as part of star-up operations. If the server 102 determines that the asset location information 104 was not received as part of star-up operations, the process 500 may comprise determining a gateway 114 that a given tagged asset 110 is associated to (i.e., stuck to). The process 500 may determine current global positioning coordinates 172 associated with the given tagged asset 110. Subsequently, the process 500 may determine whether the global positioning coordinates 172 match one or more geofence locations associated with one or more predefined areas 112. The given tagged asset 110 may be assigned to a specific jobsite location (i.e., in a predefined area 112) based at least in part matching the current global positioning coordinates 172 with a geolocation associated with a jobsite location.

Referring to the tagged asset 110A as a non-limiting example, the process 500 starts at operation 502, where the server 102 obtains updated asset location information 104 corresponding to the tagged asset 110A. As described above, the asset location information 104 may be information comprising tagged asset geolocation 128 and gateway geolocation 130. At this stage, the process 500 proceeds to operation 504, where the server 102 determines whether the updated asset location information 104 is received as a result of a gateway start-up operation. The server 102 may determine whether the whether the updated asset location information 104 is received as a result of start-up operations based on one or more power fluctuations caused by start-up procedures started at the gateway 114.

If the server 102 determines that the updated asset location information 104 is not received as a result of a gateway start-up operation (e.g., YES), then the process 500 proceeds to operation 520 in FIG. 5B. If the server 102 determines that the updated asset location information 104 is received as a result of a gateway start-up operation (e.g., YES), then the process 500 proceeds to operation 506. At operation 506, the server 102 may be configured to maintain the existing asset location information 104 associated with to the tagged asset 110A.

Turning to FIG. 5B, the process 500 continues at operation 520 from the operation 504 in FIG. 5A. At operation 520, the server 102 may determine whether the tagged asset 110A is coupled to a previously coupled gateway 114. If the server 102 determines that the tagged asset 110A is not coupled to a previously coupled gateway 114 (i.e., NO), the process 500 proceeds to operation 526. If the server 102 determines that the tagged asset 110A is coupled to a previously coupled gateway 114 (i.e., YES), the process 500 proceeds to operation 522. At operation 522, the server 102 maintains the tagged asset 110A coupled to the previously coupled gateway 114. At operation 524, the server 102 may be configured to assign asset location information 104 associated with the previously coupled gateway 114 to the tagged asset 110A. After the operation 524, the process 500 proceeds to operation 550 in FIG. 5C.

At operation 526, the server 102 may determine whether the tagged asset 110A is recently scanned by a gateway 114. If the server 102 determines that the tagged asset 110A is recently scanned by a gateway 114 (i.e., YES), the process 500 proceeds to operation 532. If the server 102 determines that the tagged asset 110A is not recently scanned by a gateway 114 (i.e., NO), the process 500 proceeds to operation 528. At operation 528, the server 102 is configured to uncouple the tagged asset 110A from any of the gateways 114. At operation 530, the server 102 may be configured to assign asset location information 104 as "LAST READ BY" the latest prior gateway 114 coupled to the tagged asset 110A. After the operation 530, the process 500 proceeds to operation 556 in FIG. 5C.

At operation 532, the server 102 may determine whether the tagged asset 110A is scanned by a new gateway 114. If the server 102 determines that the tagged asset 110A is not scanned by a new gateway 114 (i.e., NO), the process 500 proceeds to operation 534. At operation 534, the server 102 is configured to uncouple the tagged asset 110A from a prior gateway 114. At operation 536, the server 102 may be configured to assign the global positioning coordinates 172 in the updated asset location information 104 for the tagged asset 110A as being the global positioning coordinates 172 of a supplemental gateway 114. After the operation 530, the process 500 proceeds to operation 556 in FIG. 5C. If the server 102 determines that the tagged asset 110A is scanned by a new gateway 114 (i.e., YES), the process 500 proceeds to operation 538. At operation 538, the server 102 is configured to determine that the tagged asset 110A is coupled to a new gateway 114. At operation 540, the server 102 may be configured to assign the global positioning coordinates 172 in the updated asset location information 104 for the tagged asset 110A as being the global positioning coordinates 172 of a new gateway 114. After the operation 540, the process 500 proceeds to operation 556 in FIG. 5C.

Turning to FIG. 5C, the process 500 continues at operation 550 from the operation 524 or the operation 556 in FIG. 5B. In some embodiments, the process 500 continues at operation 556 from the operation 530 or the operation 536 in FIG. 5B.

At operation 550, the server 102 may determine whether the updated asset location information 104 comprises global positioning coordinates 172 that are within a prior geofence. For example, if the tagged asset 110A is dropped from a truck onto a jobsite location (i.e., both being predefined areas 112), the existing asset location information 104 may indicate global positioning coordinates 172 associated with the truck while the updated asset location information may indicate the global positioning coordinates 172 associated with the jobsite location.

If the server 102 determines that the global positioning coordinates 172 in the updated asset location information 104 are not within a prior geofence (e.g., NO), then the process 500 proceeds to operation 558. At operation 558, the server 102 may be configured to maintain the global positioning coordinates 172 from the existing asset location information 104 currently associated with the tagged asset 110A. For example, the server 102 may determine that the global positioning coordinates 172 are the same and that the tagged asset 110A is still at the truck. If the server 102 determines that the global positioning coordinates 172 in the updated asset location information 104 are within a prior geofence (e.g., YES), then the process 500 proceeds to operation 552.

At operation 552, the server 102 determines whether any jobsite assignments are associated with the tagged assets 110A. For example, the server 102 may determine whether a nearby geolocation to the tagged asset 110A is associated with a prior jobsite location. If the server 102 determines that there are any jobsite assignments associated with the tagged assets 110 (i.e., YES), then the process 500 proceeds to operation 554. At operation 554, the server 102 removes any jobsite assignments associated with the tagged asset 110A. Herein, the jobsite assignment 142 may comprise indicating that the tagged asset 110A has completed operations at the previous jobsite location. The process 500 ends if the server 102 determines that there are no jobsite assignments associated with the tagged assets 110 (i.e., NO).

At operation 556, the server 102 may be configured to determine whether the global positioning coordinates 172 are within a new geofence. If the server 102 determines that the global positioning coordinates 172 are not within the new geofence (e.g., NO), then the process 500 proceeds to operation 558. At operation 558, the server 102 may be configured to maintain existing jobsite assignment 142 associated with the tagged asset 110A. Herein, the jobsite assignment 142 may comprise indicating that the tagged asset 110A continues operations at the previous jobsite location. If the server 102 determines that the global positioning coordinates 172 are within the new geofence (e.g., YES), then the process 500 proceeds to operation 560. At operation 560, the server 102 may be configured to generate a new jobsite assignment 142 indicating that the tagged asset 110A is located within a new geofence.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:
   a memory, configured to store:
      a plurality of geofences, wherein a first geofence is associated with a first jobsite location and a second geofence is associated with a second jobsite location; and
      existing asset location information comprising current global positioning system (GPS) coordinates of one or more tagged assets; and
   a processor communicatively coupled to the memory and configured to:
      obtain first updated asset location information corresponding to a tagged asset, the first updated asset location information comprising possible updates to the existing asset location information;
      in response to determining that the tagged asset is coupled to at least one gateway associated with at least one of the first jobsite location or the second jobsite location, determine whether first global positioning coordinates in the first updated asset location information overlap the first geofence associated with the first jobsite location as distinguished from the second geofence associated with the second jobsite location;
      in response to determining that the first global positioning coordinates in the first updated asset location information overlap the first geofence of the first jobsite location among multiple jobsite locations, generate a first jobsite assignment indicating that the tagged asset is located in a first jobsite location;
      in conjunction with determining that the tagged asset is coupled to the at least one gateway, determine whether the at least one gateway is a previously coupled gateway; and
      in response to determining that the at least one gateway is the previously coupled gateway, determine global positioning coordinates of the previously coupled gateway as the first global positioning coordinates.

2. The apparatus of claim 1, wherein the processor is further configured to:
   obtain second updated asset location information corresponding to the tagged asset;
   in response to determining that the tagged asset is coupled to a previously coupled gateway, maintain the tagged asset coupled to the previously coupled gateway;
   determine global positioning coordinates of the previously coupled gateway as second global positioning coordinates of the tagged asset;
   determine whether the second global positioning coordinates are within the first geofence of the first jobsite location;
   in response to determining that the second global positioning coordinates are not within the first geofence, determine whether the tagged asset is associated with the first jobsite assignment; and
   in response to determining that the tagged asset is associated with the first jobsite assignment, remove the first jobsite assignment indicating that the tagged asset is located in the first jobsite location.

3. The apparatus of claim 1, wherein the processor is further configured to:
   obtain second updated asset location information corresponding to the tagged asset;
   in response to determining that the tagged asset is not coupled to a second gateway, determine whether the tagged asset is scanned recently;
   in response to determining that the tagged asset is not scanned recently, uncouple the tagged asset from any gateways;
   determine second global positioning coordinates as unknown;
   identify the first global positioning coordinates as in the first updated asset location information as last known global positioning coordinates;
   determine that the second global positioning coordinates in the second updated asset location information do not overlap the second geofence of the second jobsite location; and
   maintain the first jobsite assignment indicating that the tagged asset is located in the first jobsite location.

4. The apparatus of claim 3, wherein the processor is further configured to:
   determine whether the second gateway provided the first updated asset location information during a start-up operation; and
   in conjunction with determining that the second gateway provided the second updated asset location information during a start-up operation, maintain the first jobsite assignment indicating that the tagged asset is located in the first jobsite location.

5. The apparatus of claim 1, wherein the processor is further configured to:
   obtain second updated asset location information corresponding to the tagged asset;
   determine whether the tagged asset is coupled to a first gateway;
   in response to determining that the tagged asset is not coupled to the first gateway, determine whether the tagged asset is scanned recently;
   in response to determining that the tagged asset is scanned recently, determine whether the tagged asset is scanned by a second gateway;

in response to determining that the tagged asset is scanned by the second gateway, determine global positioning coordinates of the second gateway as second global positioning coordinates in the second updated asset location information;
determine that the second global positioning coordinates in the second updated asset location information overlap the first geofence of the first jobsite location; and
generate a second jobsite assignment indicating that the tagged asset is located in the first jobsite location.

6. The apparatus of claim 1, wherein the processor is further configured to:
associate the tagged asset to a label indicating that the tagged asset is a predefined asset type;
generate a report indicating that the tagged asset is associated with the first jobsite assignment, the label, and an asset name; and
present the report via an interface.

7. The apparatus of claim 1, wherein the processor is further configured to in conjunction with obtaining the first updated asset location information corresponding to the tagged asset, trigger an output of the tagged asset to indicate operation of the tagged asset.

8. A system, comprising:
one or more gateways configured to track a plurality of tagged assets; and
a server communicatively coupled to the one or more gateways and configured to:
obtain first updated asset location information corresponding to a tagged asset, the first updated asset location information comprising possible updates to existing asset location information comprising current global positioning coordinates of one or more tagged assets;
in response to determining that the tagged asset is coupled to at least one gateway associated with at least one of a first jobsite location or a second jobsite location, determine whether first global positioning coordinates in the first updated asset location information overlap a first geofence associated with the first jobsite location as distinguished from a second geofence associated with the second jobsite location;
in response to determining that the first global positioning coordinates in the first updated asset location information overlap the first geofence of the first jobsite location among multiple jobsite locations, generate a first jobsite assignment indicating that the tagged asset is located in a first jobsite location;
in conjunction with determining that the tagged asset is coupled to the at least one gateway, determine whether the at least one gateway is a previously coupled gateway; and
in response to determining that the at least one gateway is the previously coupled gateway, determine global positioning coordinates of the previously coupled gateway as the first global positioning coordinates.

9. The system of claim 8, wherein the server is further configured to:
obtain second updated asset location information corresponding to the tagged asset;
in response to determining that the tagged asset is coupled to a previously coupled gateway, maintain the tagged asset coupled to the previously coupled gateway;
determine global positioning coordinates of the previously coupled gateway as second global positioning coordinates of the tagged asset;
determine whether the second global positioning coordinates are within the first geofence of the first jobsite location;
in response to determining that the second global positioning coordinates are not within the first geofence, determine whether the tagged asset is associated with the first jobsite assignment; and
in response to determining that the tagged asset is associated with the first jobsite assignment, remove the first jobsite assignment indicating that the tagged asset is located in the first jobsite location.

10. The system of claim 8, wherein the server is further configured to:
obtain second updated asset location information corresponding to the tagged asset;
in response to determining that the tagged asset is not coupled to a second gateway, determine whether the tagged asset is scanned recently;
in response to determining that the tagged asset is not scanned recently, uncouple the tagged asset from any gateways;
determine second global positioning coordinates as unknown;
identify the first global positioning coordinates as in the first updated asset location information as last known global positioning coordinates;
determine that the second global positioning coordinates in the second updated asset location information do not overlap the second geofence of the second jobsite location; and
maintain the first jobsite assignment indicating that the tagged asset is located in the first jobsite location.

11. The system of claim 10, wherein the server is further configured to:
determine whether the second gateway provided the first updated asset location information during a start-up operation; and
in conjunction with determining that the second gateway provided the second updated asset location information during a start-up operation, maintain the first jobsite assignment indicating that the tagged asset is located in the first jobsite location.

12. The system of claim 8, wherein the server is further configured to:
obtain second updated asset location information corresponding to the tagged asset;
determine whether the tagged asset is coupled to a first gateway;
in response to determining that the tagged asset is not coupled to the first gateway, determine whether the tagged asset is scanned recently;
in response to determining that the tagged asset is scanned recently, determine whether the tagged asset is scanned by a second gateway;
in response to determining that the tagged asset is scanned by the second gateway, determine global positioning coordinates of the second gateway as second global positioning coordinates in the second updated asset location information;
determine that the second global positioning coordinates in the second updated asset location information overlap the first geofence of the first jobsite location; and
generate a second jobsite assignment indicating that the tagged asset is located in the first jobsite location.

13. The system of claim 8, wherein the server is further configured to:

associate the tagged asset to a label indicating that the tagged asset is a predefined asset type;

generate a report indicating that the tagged asset is associated with the first jobsite assignment, the label, and an asset name; and present the report via an interface.

14. The system of claim 8, wherein the server is further configured to in conjunction with obtaining the first updated asset location information corresponding to the tagged asset, trigger an output of the tagged asset to indicate operation of the tagged asset.

15. A method, comprising:

obtaining first updated asset location information corresponding to a tagged asset, the first updated asset location information comprising possible updates to existing asset location information comprising current global positioning coordinates of one or more tagged assets;

in response to determining that the tagged asset is coupled to at least one gateway associated with at least one of a first jobsite location or a second jobsite location, determining whether first global positioning coordinates in the first updated asset location information overlap a first geofence associated with the first jobsite location as distinguished from a second geofence associated with the second jobsite location;

in response to determining that the first global positioning coordinates in the first updated asset location information overlap the first geofence of the first jobsite location among multiple jobsite locations, generating a first jobsite assignment indicating that the tagged asset is located in a first jobsite location;

in conjunction with determining that the tagged asset is coupled to the at least one gateway, determining whether the at least one gateway is a previously coupled gateway; and in response to determining that the at least one gateway is the previously coupled gateway, determining global positioning coordinates of the previously coupled gateway as the first global positioning coordinates.

16. The method of claim 15, further comprising:

obtaining second updated asset location information corresponding to the tagged asset;

in response to determining that the tagged asset is coupled to a previously coupled gateway, maintaining the tagged asset coupled to the previously coupled gateway;

determining global positioning coordinates of the previously coupled gateway as second global positioning coordinates of the tagged asset;

determining whether the second global positioning coordinates are within the first geofence of the first jobsite location;

in response to determining that the second global positioning coordinates are not within the first geofence, determining whether the tagged asset is associated with the first jobsite assignment; and in response to determining that the tagged asset is associated with the first jobsite assignment, removing the first jobsite assignment indicating that the tagged asset is located in the first jobsite location.

17. The method of claim 15, further comprising:

obtaining second updated asset location information corresponding to the tagged asset;

in response to determining that the tagged asset is not coupled to a second gateway, determining whether the tagged asset is scanned recently;

in response to determining that the tagged asset is not scanned recently, uncoupling the tagged asset from any gateways;

determining second global positioning coordinates as unknown;

identifying the first global positioning coordinates as in the first updated asset location information as last known global positioning coordinates;

determining that the second global positioning coordinates in the second updated asset location information do not overlap the second geofence of the second jobsite location; and maintaining the first jobsite assignment indicating that the tagged asset is located in the first jobsite location.

* * * * *